United States Patent
Moon et al.

(10) Patent No.: US 11,423,691 B2
(45) Date of Patent: Aug. 23, 2022

(54) DISPLAY DEVICE AND METHOD FOR DRIVING THE SAME

(71) Applicant: Samsung Display Co., Ltd., Yongin-si (KR)

(72) Inventors: Seung Hyun Moon, Yongin-si (KR); Yun Ho Kim, Yongin-si (KR); Jin Oh Kwag, Yongin-si (KR); Won Sang Park, Yongin-si (KR); Bong Hyun You, Yongin-si (KR); Keum Dong Jung, Yongin-si (KR); Chui Kim, Yongin-si (KR); Jun Hee Moon, Yongin-si (KR); Deok Hwa Woo, Yongin-si (KR); Hee Chui Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/927,622

(22) Filed: Jul. 13, 2020

(65) Prior Publication Data

US 2021/0142029 A1   May 13, 2021

(30) Foreign Application Priority Data

Nov. 7, 2019   (KR) .................. 10-2019-0141350

(51) Int. Cl.
*G06V 40/13*   (2022.01)
*G06V 40/12*   (2022.01)

(52) U.S. Cl.
CPC .......... *G06V 40/1394* (2022.01); *G06V 40/13* (2022.01); *G06V 40/1365* (2022.01)

(58) Field of Classification Search
CPC ............. G06K 9/0012; G06K 9/00013; G06K 9/00087; G06K 9/00107; G06K 9/0004; G06V 40/1382–1394
See application file for complete search history.

(56) References Cited

U.S. PATENT DOCUMENTS

| | | |
|---|---|---|
| 7,783,088 B2 | 8/2010 | Shinzaki et al. |
| 10,438,046 B2 | 10/2019 | He et al. |
| 2017/0364728 A1* | 12/2017 | Bachurinskii ........ G06K 9/0012 |
| 2018/0060639 A1 | 3/2018 | Lee et al. |
| 2019/0019000 A1 | 1/2019 | Lee et al. |
| 2020/0387684 A1* | 12/2020 | Setlak .................. G06K 9/0004 |

FOREIGN PATENT DOCUMENTS

| | | |
|---|---|---|
| KR | 10-2007-0093312 A | 9/2007 |
| KR | 10-2017-0116530 A | 10/2017 |
| KR | 10-1923335 B1 | 2/2019 |
| KR | 10-2009000 B1 | 8/2019 |

* cited by examiner

*Primary Examiner* — Stephen G Sherman
(74) *Attorney, Agent, or Firm* — Lewis Roca Rothgerber Christie LLP

(57) ABSTRACT

A display device includes a display panel including a plurality of pixels configured to display an image, a photo sensor on one surface of the display panel to sense light, and a fingerprint detector configured to control a fake determination image pattern of a fingerprint sensing area of the display panel configured to sense a fingerprint, and to perform fingerprint authentication and fake fingerprint determination, based on a sensing signal supplied from the photo sensor.

13 Claims, 14 Drawing Sheets

- - - - - fingerprint (AF)
———— fake fingerprint (FF)

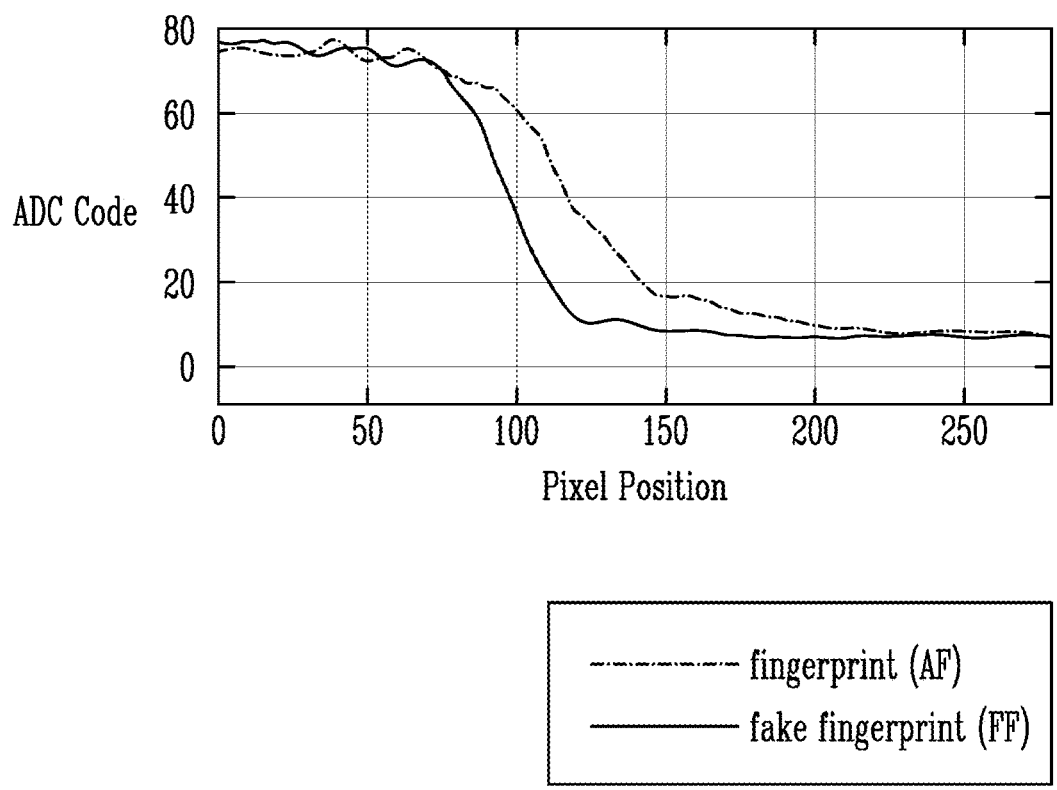

FDIP1  NEA1

FDIP2  NEA2

FDIP3  NEA3

FDIP4  NEA4

FDIP5  NEA51  NEA52

FDIP6  NEA6

FDIP7

FDIP8

FDIP9

DISPLAY DEVICE AND METHOD FOR DRIVING THE SAME

CROSS-REFERENCE TO RELATED APPLICATION

This application claims priority to and the benefit of Korean patent application No. 10-2019-0141350 filed on Nov. 7, 2019 in the Korean Intellectual Property Office, the entire disclosure of which is incorporated herein by reference.

BACKGROUND

1. Field

Aspects of the present disclosure relate to a display device.

2. Related Art

Recently, as display devices such as smartphones and tablet PCs are used in many fields, a biometric authentication method using a fingerprint of a user, and the like has been widely used. In order to provide a fingerprint sensing function, a fingerprint sensor may be built in a display device or be attached to the top and/or the bottom of the display device. The display device integrated with the fingerprint sensor is referred to as a Fingerprint on Display (FoD).

The FoD may be configured as, for example, a photosensitive type sensor. The photosensitive type FoD may use, as a light source, a light emitting device provided in a pixel, and include a photo sensor array. The photo sensor array may be implemented as, for example, a CMOS Image Sensor (CIS).

In the related art, personal authentication using such a fingerprint sensor is mainly employed in fields where security is of great concern, such as e-commerce using mobile devices, financial transactions, security of electronic devices, and approval of use. Hence, it is of great importance to improve accuracy of fingerprint recognition but also to effectively identify a forged fingerprint (hereinafter, referred to as a 'fake fingerprint') instead of a user's own registered fingerprint.

The above information disclosed in this section is only for enhancement of understanding of the context of the invention and therefore it may contain information that does not form the prior art.

SUMMARY

Aspects of some embodiments are directed to a display device for detecting a fake fingerprint by analyzing lights which are diffused from skin and then sensed in a non-emission area of a fingerprint sensing area.

Aspects of some embodiments are also directed to a method for driving the display device.

According to some embodiments of the present disclosure, there is provided a display device including: a display panel including a plurality of pixels configured to display an image; a photo sensor on one surface of the display panel to sense light; and a fingerprint detector configured to control a fake determination image pattern of a fingerprint sensing area of the display panel configured to sense a fingerprint, and to perform fingerprint authentication and fake fingerprint determination, based on a sensing signal supplied from the photo sensor.

In some embodiments, the fake determination image pattern has a non-emission area and an emission area.

In some embodiments, the fingerprint detector performs the fake fingerprint determination by analyzing a light amount sensed at the non-emission area.

In some embodiments, the fingerprint detector is configured to determine that a sensed fingerprint is a fake fingerprint in response to determining that the light amount sensed at the non-emission area is less than a reference light amount.

In some embodiments, the fingerprint detector is configured to determine that the sensed fingerprint is an actual fingerprint in response to determining that the light amount sensed at the non-emission area is greater than or equal to the reference light amount.

In some embodiments, the fingerprint detector includes: a pattern controller configured to generate the fake determination image pattern such that a non-emission area is within the fingerprint sensing area for a purpose of the fake fingerprint determination; a fake fingerprint detector configured to perform the fake fingerprint determination by comparing first sensing data corresponding to an emission area of the fake determination image pattern and second sensing data corresponding to the non-emission area with light amount information set corresponding to the fake determination image pattern; and a fingerprint analyzer configured to perform the fingerprint authentication by comparing third sensing data corresponding to the fingerprint sensing area except the non-emission area with registered fingerprint data.

In some embodiments, the fake fingerprint detector s configured to compare light profiles of a first light pattern as an expected sensing light amount of the emission area, which is included in the light amount information, and the first sensing data, and the fake fingerprint detector is configured to compare light profiles of a second light pattern as an expected sensing light amount of the non-emission area, which is included in the light amount information, and the second sensing data.

In some embodiments, the fake fingerprint detector is configured to determine that a sensed fingerprint is an actual fingerprint in response to determining that an accordance rate between the first sensing data and the first light pattern and an accordance rate between the second sensing data and the second light pattern are greater than or equal to a threshold value.

In some embodiments, the fake fingerprint detector is configured to determine that the sensed fingerprint is a fake fingerprint in response to determining that at least one of an accordance rate between the first sensing data and the first light pattern and an accordance rate between the second sensing data and the second light pattern is less than a threshold value.

In some embodiments, the display device further includes: a memory configured to store the light amount information corresponding to the fake determination image pattern and the registered fingerprint data; and a use approval determiner configured to determine whether to approve use of the display device based on the fake fingerprint determination and the fingerprint authentication.

In some embodiments, the pattern controller is configured to randomly change the fake determination image pattern displayed in the display panel in a period.

In some embodiments, the pattern controller is configured to generate the fake determination image pattern in a first period, and to stop generation of the fake determination image pattern in a second period.

In some embodiments, the fake fingerprint detector is configured to perform the fake fingerprint determination by using the first sensing data and the second sensing data, which are sensed in the first period, and the fingerprint analyzer is configured to perform the fingerprint authentication by using the third sensing data sensed in the second period.

In some embodiments, the fingerprint analyzer is configured to compare an accordance rate between a portion corresponding to the emission area in the registered fingerprint data and the third sensing data.

According to some embodiments of the present disclosure, there is provided a method for driving a display device, the method including: displaying a fake determination image pattern in a fingerprint sensing area, the fake determination image pattern having an emission area and a non-emission area; generating sensing data corresponding to the fingerprint sensing area by a photo sensor; determining a fake fingerprint by comparing light amount information corresponding to the fake determination image pattern with the sensing data; performing fingerprint authentication by comparing the sensing data and registered fingerprint data; and determining whether to approve use of the display device, based on the fingerprint authentication and the fake fingerprint determination.

In some embodiments, the determining of the fake fingerprint includes: comparing a first light pattern as an expected sensing light amount of the emission area, which is included in the light amount information, with first sensing data, and comparing a second light pattern as an expected sensing light amount of the non-emission area, which is included in the light amount information, with second sensing data; determining that a sensed fingerprint is an actual fingerprint in response to determining that an accordance rate between the first sensing data and the first light pattern and an accordance rate between the second sensing data and the second light pattern are greater than or equal to a threshold value; and determining that the sensed fingerprint is the fake fingerprint in response to determining that at least one of the accordance rate between the first sensing data and the first light pattern and the accordance rate between the second sensing data and the second light pattern is less than the threshold value.

In some embodiments, the performing of the fingerprint authentication includes: comparing an accordance rate between a portion corresponding to the emission area in the registered fingerprint data and third sensing data; determining that a sensed fingerprint accords with the registered fingerprint data in response to determining that the accordance rate is greater than or equal to a threshold value; and determining that the sensed fingerprint does not accord with the registered fingerprint data in response to determining that the accordance rate is less than the threshold value.

In some embodiments, the determining of whether to approve the use includes: approving the use, in response to determining that the sensing data and the registered fingerprint data accord with each other and in response to determining that the sensed fingerprint is the actual fingerprint; and disapproving the use in response to determining that the sensed fingerprint is the fake fingerprint.

In some embodiments, the fake determination image pattern is displayed in the fingerprint sensing area during a first period to determine the fake fingerprint, and a whole of the fingerprint sensing area emits light during a second period to perform the fingerprint authentication.

In some embodiments, the fake determination image pattern is randomly changed whenever fingerprint sensing is performed.

In the display device and the method for driving the same in accordance with some embodiments of the present disclosure, a fake fingerprint can be detected by analyzing a light amount or light pattern in the non-emission area included in the fake determination image pattern. Accordingly, the accuracy and reliability of fingerprint detection can be improved without increasing any manufacturing cost and/or any additional configuration.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawings, dimensions may be exaggerated for clarity of illustration. Like reference numerals refer to like elements throughout.

FIGS. 6A-6C are diagrams illustrating another example of the light sensed from the fingerprint sensing area of the display panel of the display device shown in FIG. 1A.

DETAILED DESCRIPTION

Figure 1A:
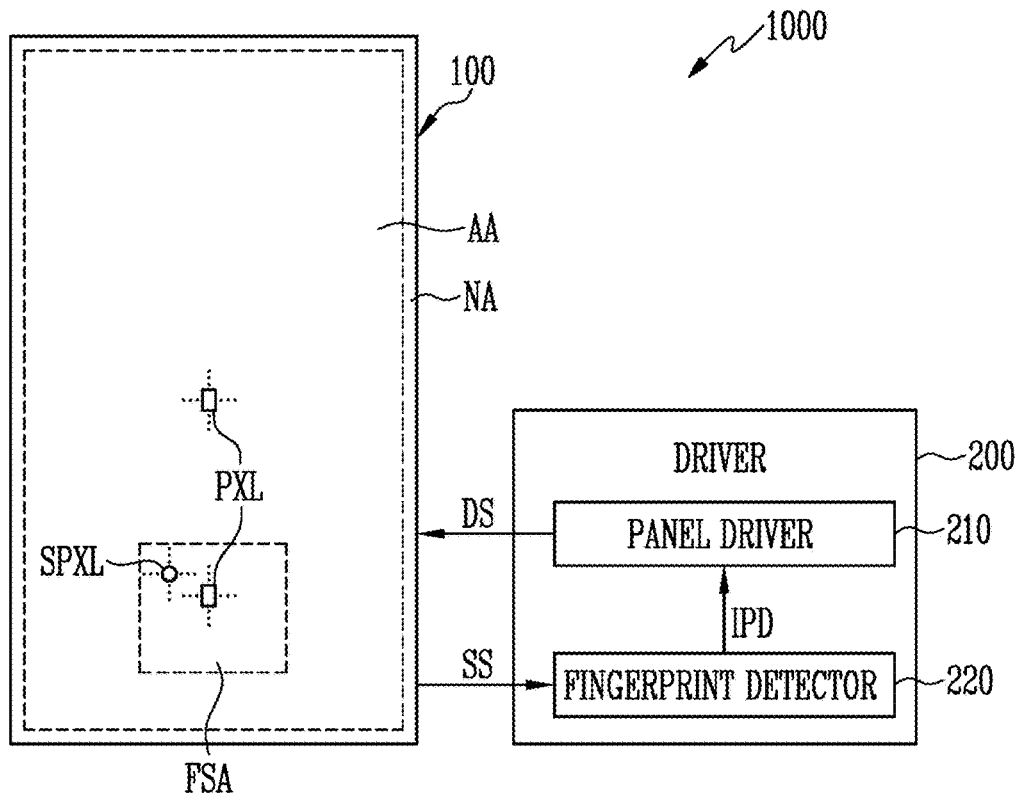
FIG. 1A is a block diagram schematically illustrating an example of a display device in accordance with an embodiment of the present disclosure.

Hereinafter, exemplary embodiments of the present disclosure will be described in more detail with reference to the accompanying drawings. Throughout the drawings, the same reference numerals are given to the same elements, and their overlapping descriptions may be omitted.

Figure 1B:
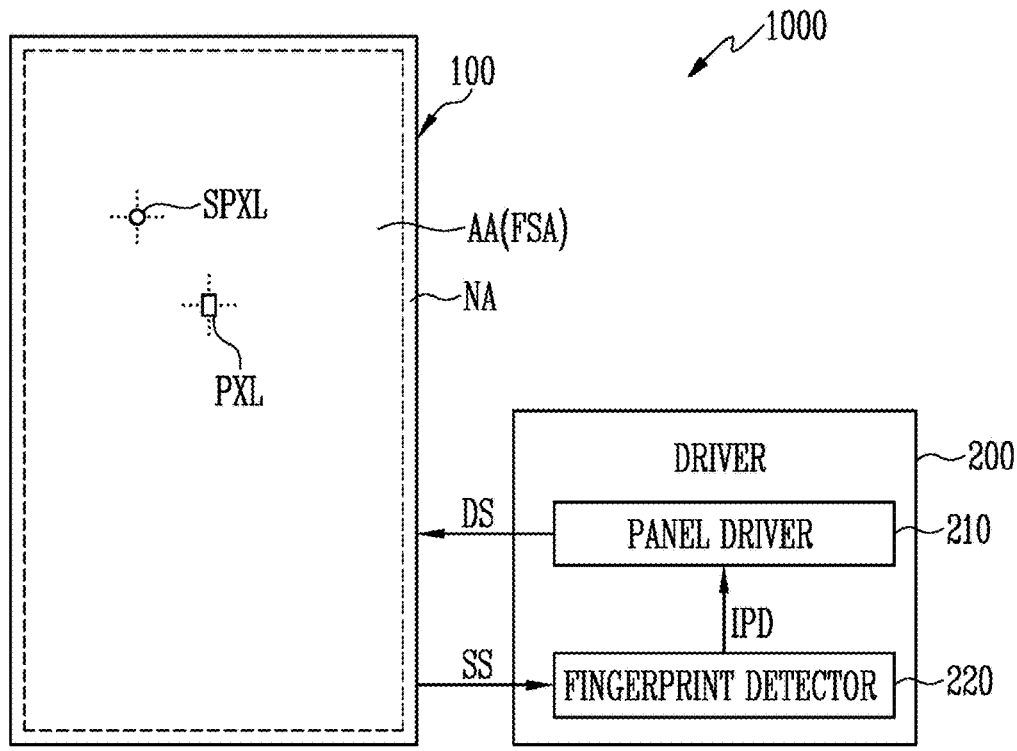
FIG. 1B is a block diagram schematically illustrating another example of the display device shown in FIG. 1A.

FIG. 1A is a block diagram schematically illustrating an example of a display device in accordance with an embodiment of the present disclosure. FIG. 1B is a block diagram schematically illustrating another example of the display device shown in FIG. 1A.

Although a case where a display panel 100 and a driver 200 are separated from (e.g., external to) each other is illustrated in FIGS. 1A and 1B, the present disclosure is not limited thereto. For example, the whole or a portion of the driver 200 may be integrally implemented (e.g., be formed as on unitary body) with the display panel 100.

Referring to FIGS. 1A and 1B, the display device 1000 may include a display panel 100 and a driver 200. The driver 200 may include a panel driver 210 and a fingerprint detector 220.

The whole or at least a portion of the display device 1000 may have (e.g., exhibit) flexibility (e.g., be bendable or foldable).

The display panel 100 includes a display area AA and a non-display area NA. The display area AA is an area in which a plurality of pixels PXL (also referred to as sub-pixels) are provided, and may be referred to as an active area. In various embodiments, each of the pixels PXL may include at least one light emitting device. The display device 1000 drives the pixels PXL, according to image data input from the outside, thereby displaying an image in the display area AA.

In an embodiment, the display area AA may include a fingerprint sensing area FSA. The fingerprint sensing area FSA may include at least some pixels PXL among the pixels PXL provided in the display area AA.

In an embodiment, as shown in FIG. 1A, at least a portion of the display area AA may be set as the fingerprint sensing area FSA.

In another embodiment, as shown in FIG. 1B, the whole of the display area AA may be set as the fingerprint sensing area FSA. When fingerprint sensing is performed, a fingerprint sensing operation may be performed on only a portion at which a touch of a user is substantially made.

Although an example in which only on fingerprint sensing area FSA is formed on the display area AA is illustrated in FIG. 1A, the technical scope of the present disclosure is not limited thereto. For example, a plurality of fingerprint sensing areas FSA arranged regularly or irregularly may be formed on the display area AA.

Also, although an example in which the fingerprint sensing area FSA is formed in at least a portion of the display area AA is illustrated in FIG. 1A, the technical scope of the present disclosure is not limited thereto. That is, in various embodiments, the display area AA and the fingerprint sensing area FSA may be provided to overlap with each other in only at least a partial area.

The non-display area NA is an area disposed at the periphery of the display area AA, and may be referred to as a non-active area. For example, the non-display area NA may include a line area, a pad area, various dummy areas, and the like.

In an embodiment, the display device 1000 may further include a plurality of sensor pixels SPXL provided in the fingerprint sensing area FSA. The sensor pixels SPXL may be configured as a sensor for sensing light. In an embodiment, when light emitted from a light source (or pixel PXL) provided in the display device 1000 is reflected by a finger of a user, the sensor pixels SPXL may sense the reflected light and output an electrical signal (e.g., a voltage signal) corresponding to the reflected light. The electrical signal may be transferred to the driver 200 (e.g., the fingerprint detector 220) which will be described later to be used for fingerprint sensing. Hereinafter, although an example in which the sensor pixels SPXL are used for fingerprint sensing is described in the present disclosure, the sensor pixels SPXL may be used to perform various suitable functions of a touch sensor, a scanner, or the like.

When the sensor pixels SPXL are arranged on the fingerprint sensing area FSA, the sensor pixels SPXL may overlap with the pixels PXL or be disposed at the periphery of the pixels PXL. For example, some or all of the sensor pixels SPXL may overlap with the pixels PXL or be disposed between the pixels PXL. In various embodiments, the sensor pixels SPXL and the pixels PXL may have sizes equal to or different from each other. The relative sizes and arrangement of the sensor pixels SPXL and the pixels PXL are not particularly limited.

When the sensor pixels SPXL are disposed adjacent to the pixels PXL or overlap with the pixels PXL at at least a portion, the sensor pixels SPXL may use, as a light source, the light emitting device provided in each pixel PXL. Therefore, the sensor pixels SPXL along with the light emitting devices provided in the pixels PXL may constitute a photosensitive type fingerprint sensor. As described above, when a display device having a built-in fingerprint sensor is configured by using the pixels PXL as light sources, without any external light source, the module thickness of the photosensitive type fingerprint sensor and the display device having the same can be decreased, and manufacturing cost can be reduced.

In various embodiments, the sensor pixels SPXL may be arranged on the other surface (e.g., a rear surface) facing a surface (e.g., a front surface) on which an image is displayed among both surfaces of the display panel 100. That is, the pixels PXL may be located between the sensor pixels SPXL and a surface of the display panel 100 that an image is displayed on. However, the present disclosure is not limited thereto.

The driver 200 may drive the display panel 100 (e.g., drive pixels PXL of the display panel 100). For example, the driver 200 may output a data signal DS corresponding to image data to the display panel 100. Also, the driver 200 may output a driving signal for the sensor pixels SPXL, and receive electrical signals (e.g., a sensing signal SS) received from the sensor pixels SPXL. The driver 200 may be capable of detecting a fingerprint shape of a user by using the electrical signals, and also of detecting a fake fingerprint.

In various embodiments of the present disclosure, the driver 200 may include the panel driver 210 and the fingerprint detector 220. For convenience, although a case where the panel driver 210 and the fingerprint detector 220 are separated from each other is illustrated in FIGS. 1A and 1B, the technical scope of the present disclosure is not limited thereto. For example, at least a portion of the fingerprint detector 220 may be integrated with (e.g., be formed as on unitary body with) the panel driver 210 or operate in connection with the panel driver 210.

The panel driver 210 may supply a data signal DS corresponding to image data to the pixels PXL while sequentially scanning the pixels PXL of the display area AA. Then, the display panel 100 may display an image corresponding to the image data.

In an embodiment, the panel driver 210 may supply a driving signal for fingerprint sensing to the pixels PXL. The driving signal may be provided to allow the pixels PXL to operate as light sources for the sensor pixels SPXL by emitting lights. Therefore, the driving signal for fingerprint sensing may be provided to pixels PXL provided in a specific area of the display panel 100 (e.g., to pixels PXL provided in the fingerprint sensing area FSA).

In an embodiment, image data corresponding to the fingerprint sensing area FSA may be provided or controlled by the fingerprint detector 220. For example, in a fingerprint sensing operation, the fingerprint detector 220 may provide the panel driver 210 with image data corresponding to a fake determination image pattern IPD to be displayed in the fingerprint sensing area FSA, or may provide the panel driver 210 with compensation data or control signal, which corresponds to the fake determination image pattern IPD.

In addition, the driving signal for fingerprint sensing may be provided by the fingerprint detector 220.

The fingerprint detector 220 may transfer a driving signal (e.g., a driving voltage) for driving the sensor pixels SPXL, and detect a fingerprint of a user, based on electrical signals received from the sensor pixels SPXL. For example, the fingerprint detector 220 may perform fingerprint authentication and fake fingerprint determination, based on a sensing signal SS supplied from the sensor pixels SPXL (e.g., from a photo sensor).

In an embodiment, the fingerprint detector 220 may control a fake determination image pattern of the fingerprint sensing area FSA, and may perform fingerprint authentication and fake fingerprint determination, based on a sensing signal SS supplied from a photo sensor including the sensor pixels SPXL, etc. The fake determination image pattern may include a non-emission area and an emission area. The fingerprint detector 220 may determine whether a sensed fingerprint is a fake fingerprint by analyzing a light amount sensed in the non-emission area (e.g., by analyzing the intensity of light sensed in the non-emission area).

For example, when the light amount sensed in the non-emission area is less than a set or predetermined reference light amount, the fingerprint detector 220 may determine that the sensed fingerprint is a fake fingerprint. When the light amount sensed in the non-emission area is greater than or equal the set or predetermined reference light amount, the fingerprint detector 220 may determine that the sensed fingerprint is an actual biometric fingerprint.

Figure 2A:
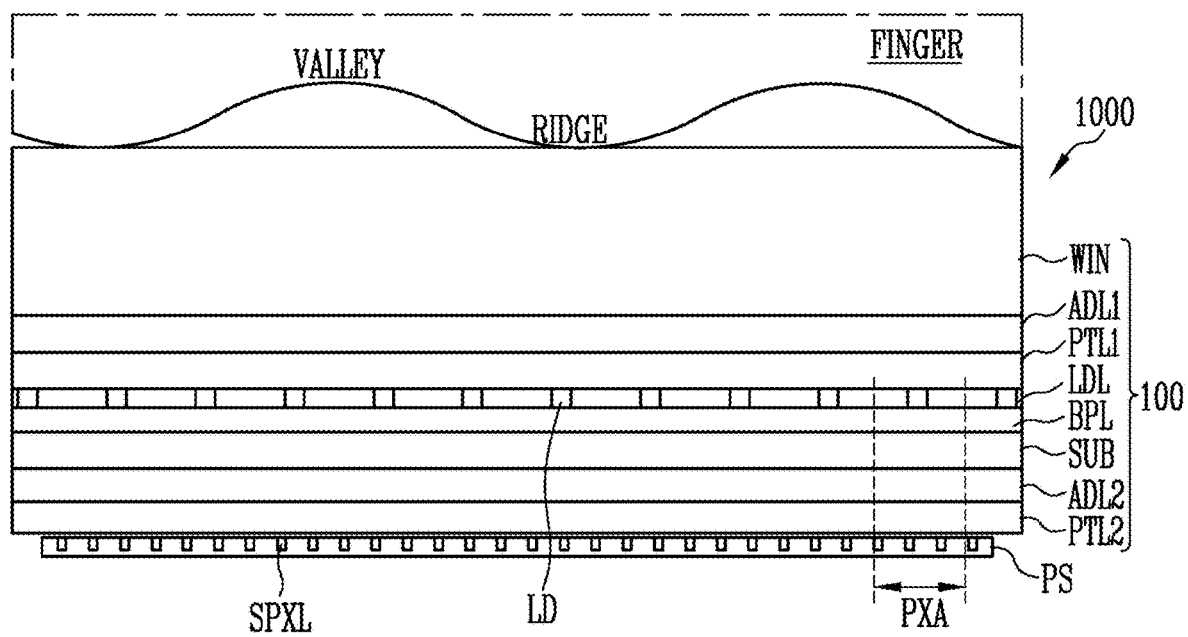
FIG. 2A is a sectional view illustrating an example of the display device shown in FIG. 1A.

FIG. 2A is a sectional view illustrating an example of the display device shown in FIG. 1A.

For example, FIG. 2A illustrates an example of a section in the fingerprint sensing area FSA of the display device 1000 shown in FIGS. 1A and 1B.

Referring to FIGS. 1A to 2A, the display device 1000 may include the display panel 100 in the fingerprint sensing area FSA and a photo sensor PS disposed on one surface of the display panel 100. Also, the display device 1000 may include a substrate SUB, and a circuit element layer BPL, a light emitting device layer LDL, a first protective layer PTL1, a first adhesive layer ADL1, and a window WIN, which are sequentially disposed on one surface (e.g., an upper surface) of the substrate SUB. Also, the display device 1000 may include a second adhesive layer ADL2 and a second protective layer PTL2, which are sequentially disposed on another surface (e.g., a lower surface) of the substrate SUB in the fingerprint sensing area FSA.

The substrate SUB is a base substrate of the display panel 100, and may be substantially a transparent transmissive substrate. The substrate SUB may be a rigid substrate including glass, tempered glass, and/or the like, or may be a flexible substrate made of plastic and/or the like. However, the material of the substrate SUB is not limited thereto, and the substrate SUB may be made of various suitable materials.

The circuit element layer BPL may be disposed on the one surface of the substrate SUB, and include at least one conductive layer. For example, the circuit element layer BPL may include a plurality of circuit elements constituting pixel circuits of the pixels PXL and lines for supplying various power sources and signal for driving the pixels PXL. The circuit element layer BPL may include various suitable types of circuit elements such as at least one transistor and at least one capacitor, and a plurality of conductive layers for constituting lines connected to the circuit elements. Also, the circuit element layer BPL may include at least one insulating layer provided between the plurality of conductive layers.

The light emitting device layer LDL may be disposed on one surface of the circuit element layer BPL. The light emitting device layer LDL may include a plurality of light emitting devices LD connected to the circuit elements and/or the lines of the circuit element layer BPL through contact holes, etc. In an embodiment, at least one of the plurality of light emitting devices LD may be provided in each pixel PXL. For example, the light emitting device LD may be configured as an organic light emitting device, an inorganic light emitting device such as a micro LED, or the like.

Each of the pixels PXL may include circuit elements disposed in the circuit element layer BPL and at least one light emitting device LD disposed in the light emitting device layer LDL on the top of the circuit element layer BPL.

The first protective layer PTL1 may be disposed on the top of the light emitting device layer LDL to cover the display area AA. The first protective layer PTL1 may include an encapsulating member such as a thin film encapsulation (TFE) layer or an encapsulation substrate, and may additionally include a protective film, and the like in addition to the encapsulating member.

The first adhesive layer ADL1 is disposed between the first protective layer PTL1 and the window WIN to couple the first protective layer PTL1 and the window WIN to each other. The first adhesive layer ADL1 may include a transparent adhesive such as an optically clear adhesive (OCA), and include various suitable adhesive materials in addition to the transparent adhesive.

The window WIN is a protective member disposed at a module uppermost portion of the display device 1000 including the display panel 100, and may be substantially a transparent transmissive substrate. The window WIN may have a multi-layered structure selected from a glass substrate, a plastic film, and a plastic substrate. The window WIN may include a rigid or flexible substrate, and the material constituting the window WIN is not particularly limited and may include any suitable material.

In various embodiments of the present disclosure, the display device 1000 may further include a polarizing plate, an anti-reflective layer, and/or a touch sensor layer (e.g., a touch electrode layer). For example, the display device 1000 may further include a polarizing plate and/or a touch sensor layer, and be disposed between the first protective layer PTL1 and the window WIN.

The second protective layer PTL2 may be disposed on the other surface of the substrate SUB. The second protective layer PTL2 may be coupled to the substrate SUB by the second adhesive layer ADL2.

The second adhesive layer ADL2 may firmly couple (e.g., fixedly couple or attach) the substrate SUB and the second protective layer PTL2 to each other. The second adhesive layer ADL2 may include a transparent adhesive such as an OCA. The second adhesive layer ADL2 may include a pressure sensitive adhesive (PSA) in which an adhesive material acts when pressure for allowing the second adhesive layer ADL2 to be adhered to an adhesive surface is applied. When the second adhesive layer ADL2 includes the PSA, the second adhesive layer ADL2 may be attached to the adhesive surface by using pressure without separate thermal treatment or UV treatment at room temperature.

The second protective layer PTL2 prevents oxygen and moisture from being introduced thereto (or substantially reduce introduction of oxygen and moisture thereto) from the outside, and may be provided in the form of a single layer or multi-layer. The second protective layer PTL2 may be configured in a film form, to further ensure flexibility of the display panel 100. The second protective layer PTL2 may be coupled to the sensor layer PSL through another adhesive layer including a transparent adhesive such as an OCA.

In various embodiments, a selective light blocking film may be further provided on the bottom of the second protective layer PTL2. The selective light blocking film blocks a specific frequency region, for example, ultraviolet light in external light introduced to the display device 1000, to prevent or substantially prevent the corresponding light from being incident on sensor pixels SPXL of the photo sensor PS. Although a case where the selective light blocking film is further provided on the bottom of the second protective layer PTL2 is described in the above, the scope of the present disclosure is not limited thereto.

The photo sensor PS is attached to the other surface (e.g., the rear surface) of the display panel 100 through an adhesive or the like to overlap with at least one area of the display panel 100. For example, the photo sensor PS may be disposed to overlap with the display panel 100 in the fingerprint sensing area FSA. The photo sensor PS may include a plurality of sensor pixels SPXL dispersed at a set or predetermined resolution and/or a set or predetermined distance.

In an embodiment, an optical system which provides a light path by concentrating lights advancing toward the photo sensor PS may be provided on the photo sensor PS. In the optical system, a width of a light transmitting part for guiding light may be determined by considering sensing precision and light conversion efficiency. The concentration ratio of lights incident on the photo sensor PS can be improved by the optical system. In some embodiments, the optical system may be formed of optical fiber, silicon, etc.

The sensor pixels SPXL may have an appropriate number, an appropriate size, and an appropriate arrangement such that a fingerprint image to be identifiable from electrical signals output by the sensing pixels SPXL can be generated. The distance between the sensor pixels SPXL may be densely set (e.g., the sensor pixels SPXL may be closely positioned) such that reflected light reflected from an object to be observed (e.g., a fingerprint or the like) can be incident on at least two adjacent sensor pixels SPXL.

The sensor pixels SPXL may output a corresponding electrical signal, for example, a voltage signal by sensing external light. Reflected lights received by the respective sensor pixels SPXL may have optical characteristics (e.g., frequencies, wavelengths, sizes, etc.) caused by valleys and ridges of a fingerprint formed on a finger of a user. Therefore, each of the sensor pixels SPXL may output a sensing signal SS having different electrical characteristics, corresponding to the optical characteristics of the reflected lights.

In an embodiment, the sensing signal SS output by the sensor pixels SPXL may be converted into image data by the fingerprint detector 220, to be used for fingerprint identification (i.e., fingerprint authentication) of a user. In addition, the fingerprint detector 220 may analyze an optical profile for a portion of the sensing signal SS, and detect a fake fingerprint, based on the analyzed optical profile.

Figure 2B:
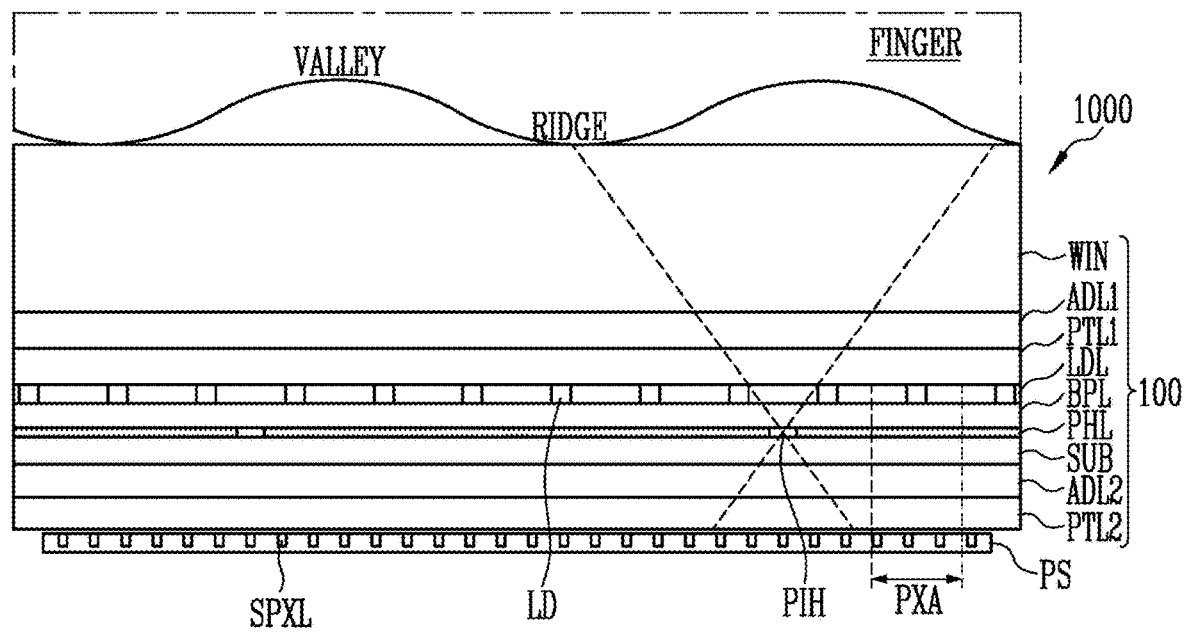
FIG. 2B is a sectional view illustrating another example of the display device shown in FIG. 1A.

FIG. 2B is a sectional view illustrating another example of the display device shown in FIG. 1A.

Referring to FIGS. 1A and 2B, in another embodiment of the present disclosure, the display device 1000 may further include a light blocking layer PHL having pin holes PIH. The light blocking layer PHL may be disposed in the display panel 100 or between the display panel 100 and the sensor pixels SPXL, to block some of lights incident on the sensor pixels SPXL. For example, some of lights incident on the light blocking layer PHL may be blocked, and the others may reach the sensor pixels SPXL under the light blocking layer PHL by passing through the pin holes PIH.

Each of the pin holes PIH may refer to an optical hole, and be a kind of light passing hole. For example, the pin hole PHI may be a light passing hole having the smallest size (e.g., area) among light passing holes disposed when layers of the display device 1000 overlap with each other, on a path along which reflected light passes through the display panel 100 in an oblique direction or vertical direction and then is incident on the sensor pixels SPXL.

The pin holes PIH may have a set or predetermined width, for example, a width w in a range of 5 μm to 20 μm. In this manner, the width of an optical opening area, which is to be secured in each layer of the display device 1000, may be gradually increased as each pin hole PIH becomes more distant from the light blocking layer PHL (i.e., as the pin hole PIH approaches in upper and lower directions).

The width (or diameter) of the pin holes PIH may be set to about ten times longer than the wavelength of reflected light, for example, about 4 μm or about 5 μm or more so as to prevent or substantially reduce diffraction of light. Also, the width of the pin holes PIH may be set to a size large enough to prevent or substantially reduce image blur and to more clearly (e.g., more precisely) sense the shape of a fingerprint. For example, the width of the pin holes PIH may be set to about 15 μm or less. However, the present disclosure is not limited thereto, and the width of the pin holes PIH may vary depending on the wavelength band of reflected light and/or the thickness of a module for each layer.

Only reflected lights passing through the pin holes PIH may reach the sensor pixels SPXL. A phase of light reflected from a fingerprint by the pin hole PIH having a very narrow width and a phase of light forming an image at the photo sensor PS may have a difference of 180 degrees.

The sensor pixels SPXL may output a sensing signal SS, for example, a voltage signal corresponding to the reflected light received thereby.

However, this is merely illustrative, and the configuration, arrangement, driving method, etc. of a photo sensor for detecting light reflected from a fingerprint are not limited to the photo sensor PS shown in FIG. 2A or 2B.

Figure 3A:
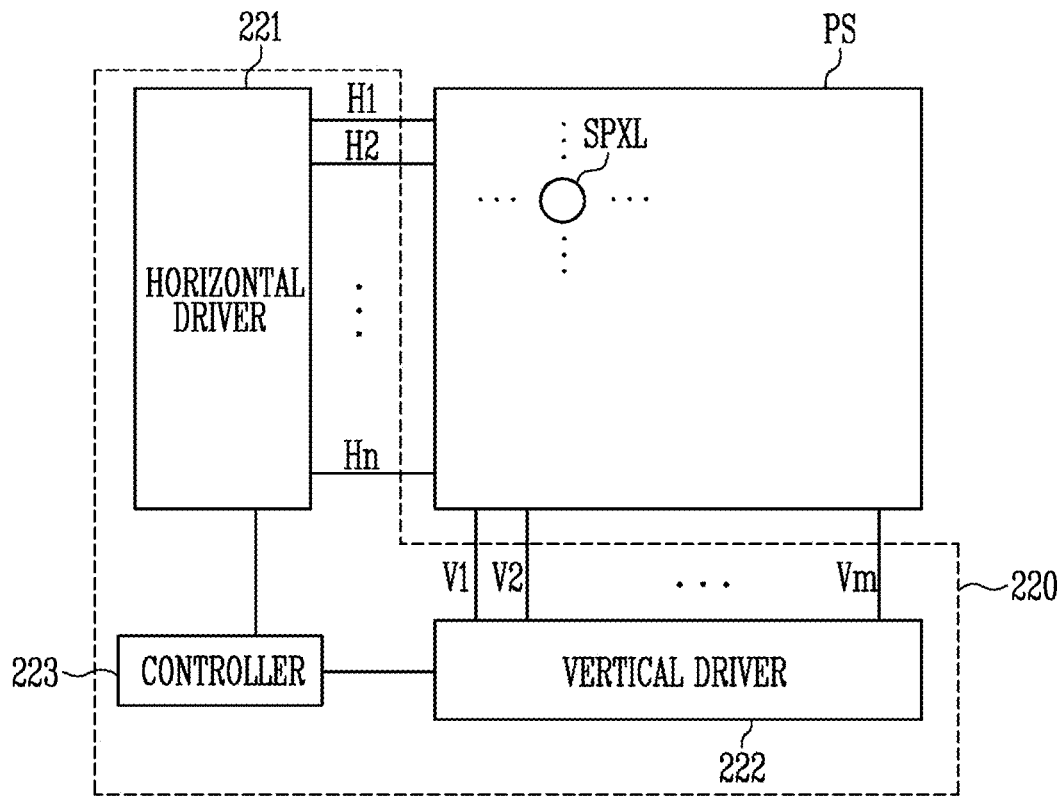
FIG. 3A is a block diagram illustrating an example of a configuration of a photo sensor and a fingerprint detector, which are included in the display device shown in FIG. 1A.

FIG. 3A is a block diagram illustrating an example of a configuration of the photo sensor and the fingerprint detector, which are included in the display device shown in FIG. 1A.

Referring to FIGS. 1A and 3A, the photo sensor PS may include an array of sensor pixels SPXL. In an embodiment, the sensor pixels SPXL may be arranged in a two-dimensional array, but the present disclosure is not limited thereto. Each of the sensor pixels SPXL may include a photoelectric device which converts incident light into electric charges according to an amount of the light.

The fingerprint detector 220 may include a horizontal driver 221, a vertical driver 222, and a controller 223.

The horizontal driver 221 may be connected to the sensor pixels SPXL through driving lines H1 to Hn. The horizontal driver 221 may be configured as a shift register, an address decoder, or the like. In various embodiments, the horizontal driver 221 may apply a driving signal to drive selected sensor pixels SPXL among the sensor pixels SPXL. For example, the horizontal driver 221 may apply a driving signal in a unit of a sensor pixel row. In other words, the horizontal driver 221 may supply the driving signal on a row-by-row basis.

Sensor pixels SPXL selected and driven by the horizontal driver 221 sense light by using photoelectric devices provided therein, and output an electrical signal (e.g., sensing signal SS), for example, a voltage signal corresponding to the sensed light. The output electrical signal may be an analog signal (e.g., a continuous, time-varying signal with non-fixed amplitude values).

The vertical driver 222 may be connected to the sensor pixels SPXL through signal lines V1 to Vm. The vertical driver 222 may perform processing on a signal output from the sensor pixels SPXL.

For example, the vertical driver 222 may perform Correlated Double Sampling (CDS) processing for removing noise from an electrical signal received thereby. Also, the vertical driver 222 may convert an analog signal received from the sensor pixel SPXL into a digital signal. In an embodiment, an analog-digital conversion device may be provided for each sensor pixel column, to process, in parallel (e.g., concurrently/simultaneously), analog signals received from the sensor pixel columns.

The controller 223 may control the horizontal driver 221 and a vertical driver 222.

In an embodiment, the controller 223 may generate image data corresponding to the sensing signal SS received from the vertical driver 222, and perform processing on the generated image data. Also, in an embodiment, the controller 223 may detect a fingerprint from the processed image data, or authenticate the detected fingerprint and/or transmit the detected fingerprint to the outside. For example, the controller 223 may include at least some of the components included in a fingerprint detector 220, or perform functions of at least some of the components of the fingerprint detector 220.

However, this is merely illustrative, and generation of image data and fingerprint detection are not necessarily performed by the controller 223, and may be performed by an external host processor, or the like.

Figure 3B:
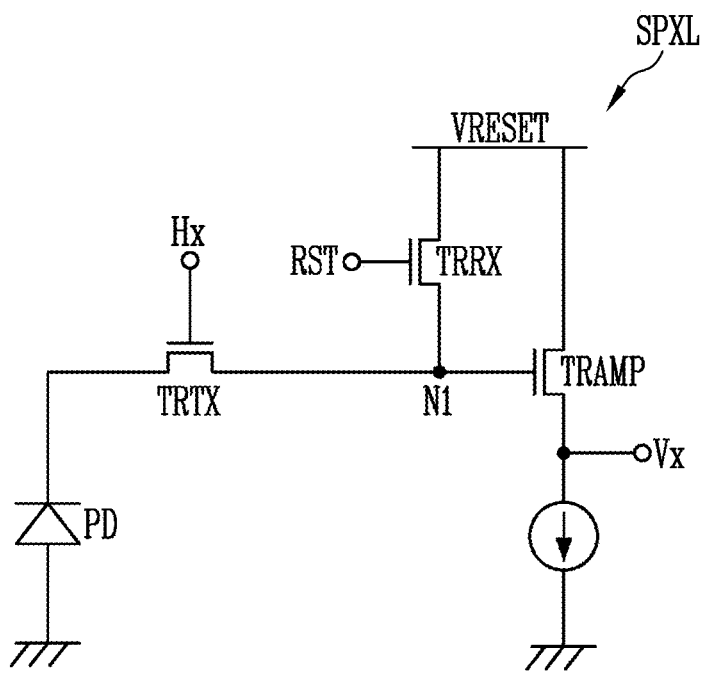
FIG. 3B is a circuit diagram illustrating an example of a sensor pixel included in the photo sensor shown in FIG. 3A.

FIG. 3B is a circuit diagram illustrating an example of a sensor pixel included in the photo sensor shown in FIG. 3A.

In FIG. 3B, a sensor pixel SPXL disposed on an xth (x is a natural number) sensor pixel row and an xth sensor pixel column is illustrated.

Referring to FIGS. 3A and 3B, the sensor pixel SPXL includes a photo diode PD as an example of the photoelectric device, a transmission transistor TRTX, a reset transistor TRRX, and an amplification transistor TRAMP. In FIG. 3B, an example in which the transistors are implemented with an N-type transistor is illustrated. However, embodiments of the present disclosure are not limited thereto, and in various embodiments, at least some of the transistors may be implemented with a P-type transistor, and corresponding to this, the circuit structure of the sensor pixel SPXL may be variously modified.

An anode electrode of the photo diode PD is grounded (e.g., electrically grounded). The transmission transistor TRTX is connected between a cathode electrode of the photo diode PD and a first node N1, and a gate electrode of the transmission transistor TRTX is connected to the horizontal driver 221. The transmission transistor TRTX is turned on when a driving signal is applied through a driving line Hx, to operate as a transmission gate unit that transfers electric charges converted from light in the photo diode PD to the first node as an electric charge voltage converter.

The reset transistor TRRX is connected between a reset power source VRESET and the first node N1, and may receive a reset signal applied through a gate electrode connected to a reset line RST. The reset transistor TRRX is turned on when the reset signal is applied, to reset a voltage of the first node N1 as a voltage of the reset power source VRESET.

The amplification transistor TRAMP is connected between the reset power source VRESET and a signal line Vx, and a gate electrode of the amplification transistor TRAMP is connected to the first node N1. The amplification transistor TRAMP operates as an amplifier that outputs a signal corresponding to the voltage of the first node N1 to the signal line Vx.

In various embodiments, the structure of the sensor pixel SPXL is not limited to that described above, and the sensor pixel SPXL may include, for example, four or more transistors or two or less transistors.

Figure 4:
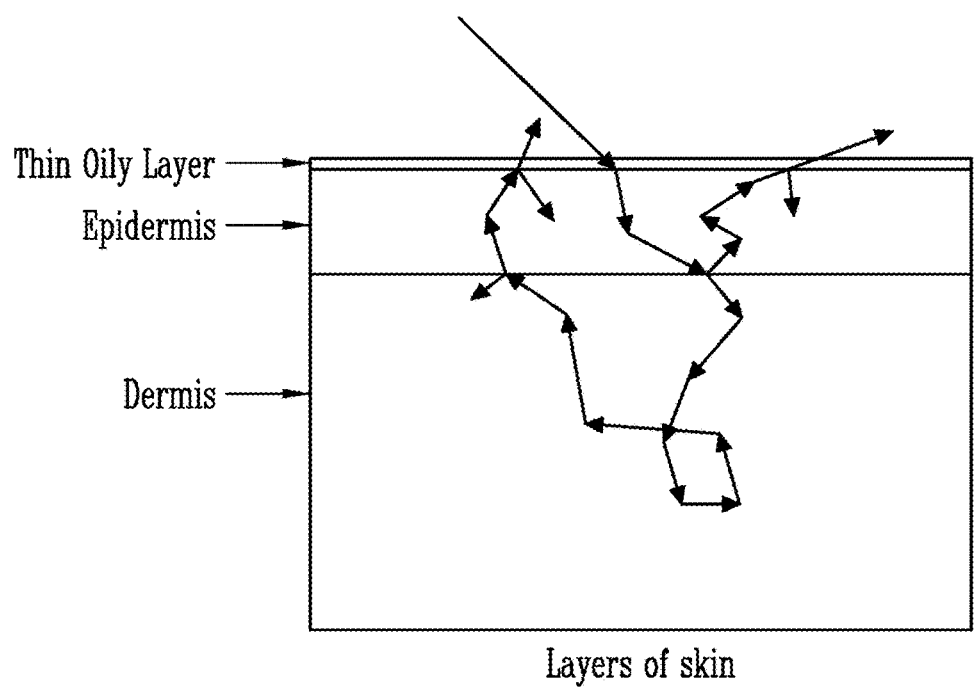
FIG. 4 is a diagram illustrating an example of a path of light incident on the skin of a user.

FIG. 4 is a diagram illustrating an example of a path of light incident on the skin of a user.

Referring to FIG. 4, at least a portion of light irradiated onto skin of a person for the purpose of fingerprint sensing may be absorbed into the skin.

Skin of a finger for fingerprint sensing includes an oily layer, an epidermis, and a dermis.

The oily layer, the epidermis, and the dermis have different light absorption rates and different refractive indices. Therefore, at least a portion of light irradiated onto the skin is diffused and refracted in the oily layer, the epidermis, and the dermis and then radiated to the outside of the skin. That is, when light emitted from a light source (or pixel) is reflected by a finger of a user, an incident angle of light incident on the finger and an emission angle of light (e.g., reflected light) emitted from (e.g., reflected from) the finger are different from each other. In addition, the reflected light emitted from the finger may be spread in all directions due to reflection, absorption, and refraction characteristics of each of the oily layer, the epidermis, and the dermis.

For example, when the finger is in contact with a fingerprint sensing area including a non-emission area with a set or predetermined size or more, light of a set or predetermined pattern may be detected even in the non-emission area by light which is absorbed into the skin and then radiated (e.g., reflected) to the outside of the skin.

A fake fingerprint may be one obtained by printing a fingerprint image on a transparent film or paper, or may generally be made as a fingerprint shape by putting a material such as silicon, rubber, gelatin, or glue for wood in a fingerprint mold and then hardening the material. Because the fake fingerprint has optical properties different from those of the skin, the fake fingerprint may be detected by using the optical properties.

For example, a two-dimensional (2D) fake fingerprint using a film, a fake fingerprint manufactured by using a single material, and the like have optical properties different from those of the finger, and hence differences exist in terms of light amount, light pattern, etc. of reflected light detected. For example, fingerprint detectors (e.g., 220 shown in FIG. 1) in accordance with embodiments of the present disclosure may detect a fake fingerprint by analyzing a difference between a degree of diffusion of light reflected from the fake fingerprint and a degree of diffusion of light reflected from the finger.

FIGS. 5A-5D are diagrams illustrating an example of light sensed from the fingerprint sensing area of the display panel of the display device shown in FIG. 1A.

Referring to FIGS. 1A, 1B, and 5A-5D, the fingerprint sensing area FSA may be included in the display area AA of the display panel 100.

In an embodiment, in fingerprint sensing, a fake determination image pattern IPD may be displayed in the fingerprint sensing area FSA so as to perform fake fingerprint determination. The fake determination image pattern IPD may include a non-emission area NEA and an emission area EA. Pixels PXL corresponding to the non-emission area NEA emit no light, and lights emitted from pixels PXL corresponding to the emission area EA are reflected from a fingerprint of a finger. The photo sensor (or the sensor pixels SPXL) may sense light reflected from the finger.

Figure 5A:
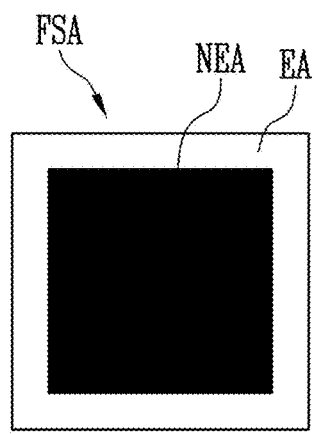
FIGS. 5A-5D are diagrams illustrating an example of light sensed from a fingerprint sensing area of a display panel of the display device shown in FIG. 1A.
Figure 5B:
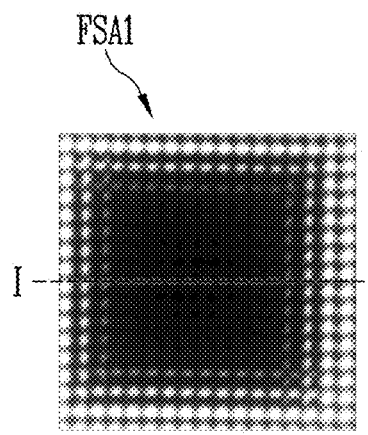
Figure 5C:
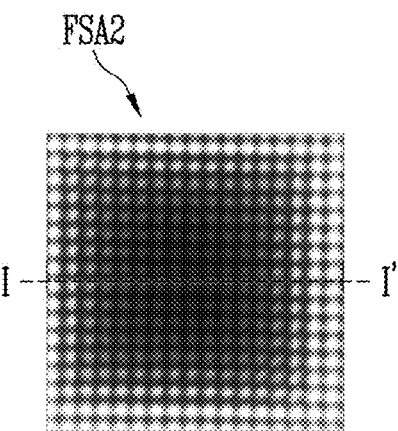

FIGS. 5A-5C respectively illustrate an image of the fingerprint sensing area FSA, image data FSA1 (hereinafter, referred to as fake fingerprint image data) of the fingerprint sensing area FSA, which is detected by the fingerprint detector 220 with respect to a fake fingerprint, and image data FSA2 (hereinafter, referred to as an actual fingerprint image data) of the fingerprint sensing area FSA, which is detected by the fingerprint detection 220 with respect to an actual fingerprint. A bright portion of each of the image data FSA1 and FSA2 may correspond to a portion at which reflected light from a target object for fingerprint sensing is detected, and a dark portion (or a black portion) of each of the image data FSA1 and FSA2 may correspond to a portion at which the reflected light is not detected.

In an embodiment, each of the image data FSA1 and FSA2 shown in FIGS. 5B-5C may represent an image output from the fingerprint detector 220 of the display device 1000 including the pin holes PIH (or a pin hole optical system) described with reference to FIG. 2B. Accordingly, an image corresponding to each of the image data FSA1 and FSA2 may be expressed as a grid pattern through light path formation caused by the pin holes.

As for a fake fingerprint using a film or the like, surface reflection occupies a majority of reflected lights, and hence the probability that reflected light will be diffused is low. Therefore, as shown in FIGS. 5A-5C, the probability that light will be detected in the non-emission area NEA may be remarkably lowered, or light may be hardly detected.

However, as for the actual fingerprint image data FSA2, reflected light may be detected even in the non-emission area NEA. That is, as described with reference to FIG. 4, reflected light incident on the display device 1000 from skin may be diffused in all directions by light diffusion and refraction according to the structure of the skin. Therefore, reflected light passing through the pin hole optical system may be detected even in the non-emission area NEA of the actual fingerprint image data FSA2.

Figure 5D:
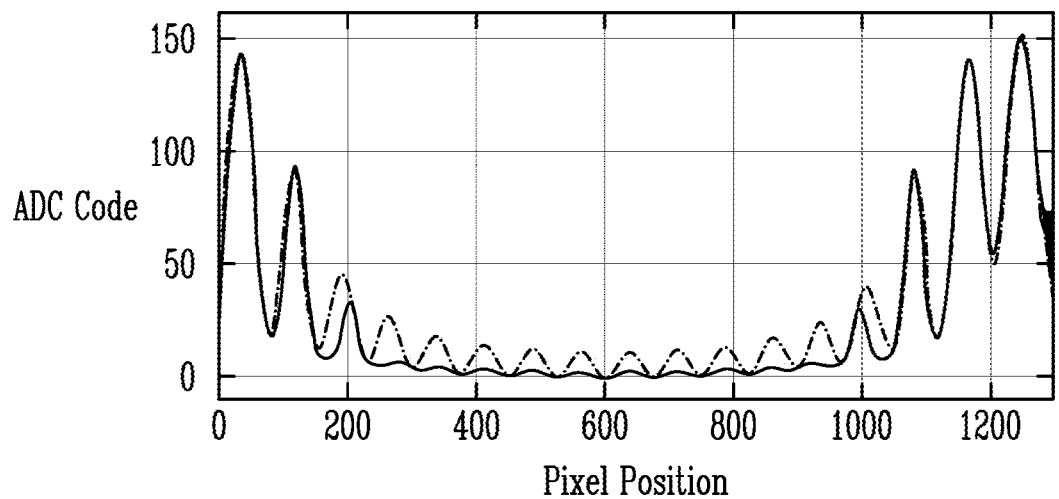

FIG. 5D illustrates a graph comparing sensing data (e.g., sensing signals SS) including light amount information of portions I-I' shown in FIG. 5B-5C according to a fake fingerprint FF and an actual fingerprint AF. The x axis of the graph represents pixel positions, and the y axis of the graph represents values that are ADC Code obtained by converting light amounts included in sensing data into digital codes. A range from pixel position 200 to pixel position 1000 may correspond to the non-emission area NEA of the fingerprint sensing area FSA, and the other pixel positions may correspond to the emission area EA of the fingerprint sensing area FSA.

As shown in FIG. 5D, a light amount of a set or predetermined reference or more may be detected (e.g., averagely detected) from the actual fingerprint AF in the non-emission area NEA. In addition, light detected in the non-emission area NEA through the pin hole optical system may have a set or predetermined light pattern. For example, in the light pattern in the non-emission area NEA, a tendency (e.g., probability) that a light amount is increased/decreased in a Gaussian form (or ripple form) having a set or predetermined peak value is repeated. A tendency of a light pattern and/or a light amount change may be stored in a memory or the like.

However, no light is detected in the non-emission area NEA from sensing data according to sensing of the fake fingerprint FF. For example, a probability that reflected light reflected from the fake fingerprint FF in the emission area EA will reach a sensor pixel SPXL corresponding to the non-emission area NEA and a light amount of the reflected light are different from those of the actual fingerprint AF. In addition, a light amount (e.g., a light intensity) and a light pattern may be calculated by a material having an absorption rate and a scattering coefficient, which are different from those of skin. Therefore, the light pattern in the non-emission area NEA may be output with a form (e.g., pattern) and a tendency (e.g., probability), which are different from those of the actual fingerprint AF.

The fake fingerprint FF can be detected (e.g., relatively easily detected) by analyzing a difference in light amount and/or light pattern in the non-emission area NEA, which is caused by differences in optical properties (e.g., a light absorption rate, a light reflectance, a refractive index, a scattering coefficient, and the like) between the actual fingerprint AF and the fake fingerprint FF.

Figure 6A:
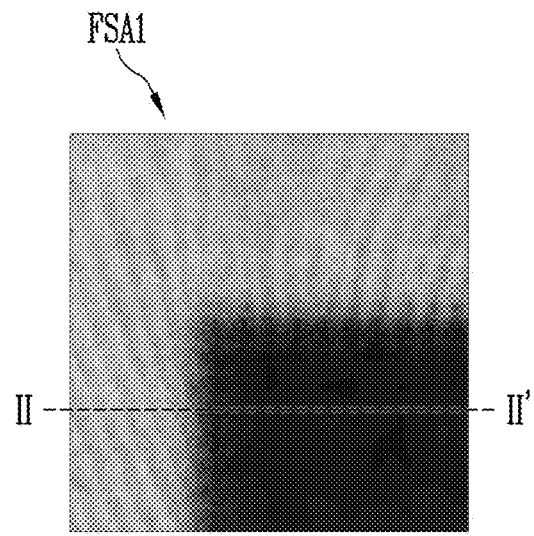
Figure 6B:
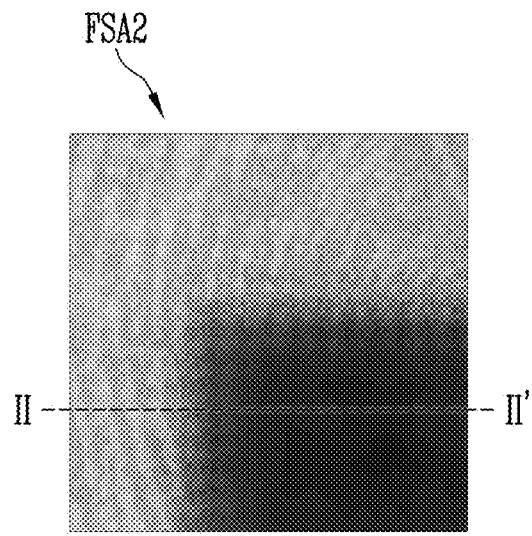

FIGS. 6A-6C are diagrams illustrating another example of the light sensed from the fingerprint sensing area of the display panel of the display device shown in FIG. 1A.

In FIGS. 6A-6C, components identical to those described with reference to FIGS. 5A-5C are designated by like reference numerals, and descriptions thereof may not be repeated.

Referring to FIGS. 1A and 5A-5C to 6C, the fake fingerprint image data FSA1 and the actual fingerprint image data FSA2 may have different light amount information of a boundary between the emission area EA and the non-emission area NEA. In other words, the light amount at the boundary between the emission are EA and the non-emission area NEA of the fake fingerprint image data FSA1 and of the actual fingerprint image data FSA2 are different.

FIGS. 6A-6B respectively illustrate image data FSA1 and FSA2 of a portion of the fingerprint sensing area FSA. In an embodiment, the image data FSA1 and FSA2 shown in FIGS. 6A-6C may be image data of reflected light detected through the general optical system described with reference to FIG. 2A. As shown in FIGS. 6A-6B, reflected light that is reflected from the actual fingerprint may reach the sensor pixel SPXL of the non-emission area NEA through an adjacent optical system. Therefore, a gradation of a boundary area between the emission area and the non-emission area of the actual fingerprint image data FSA2 may exist.

On the other hand, a boundary between the emission area EA and the non-emission area NEA of the fake fingerprint image data FSA1 may be relatively clearly distinguished (e.g., may be readily distinguishable).

FIG. 6C illustrates a graph comparing sensing data (or sensing signals SS) including light amount information of portions II-II' shown in FIGS. 6A-6B according to the fake fingerprint FF and the actual fingerprint AF.

In the graph shown in FIG. 6C, the light amount according to the fake fingerprint FF in the boundary area between the emission area EA and the non-emission area NEA (e.g., an area between pixel position 100 and pixel position 200 shown in FIG. 6C) is relatively rapidly changed. However, the light amount in the boundary area according to the actual fingerprint AF may be changed more gently (e.g., more gradually or at a slower rate) than that of the fake fingerprint FF.

In the fingerprint detector 220 and the display device 1000 in accordance with the embodiments of the present disclosure, a fake fingerprint can be detected based on a difference in light amount between the emission area EA and the non-emission area NEA.

Figure 7:
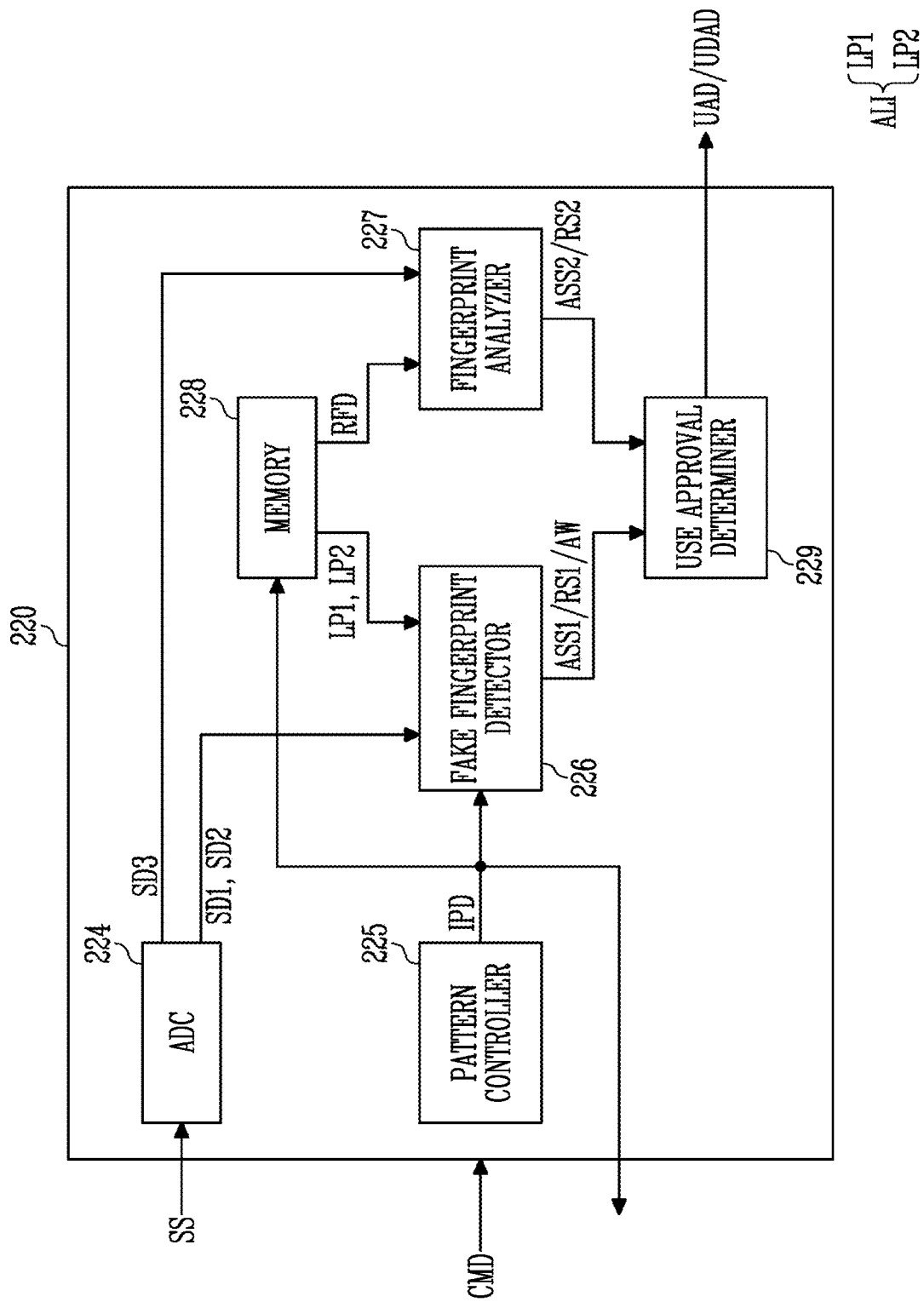
FIG. 7 is a block diagram illustrating an example of the fingerprint detector included in the display device shown in FIG. 1A.
Figure 8A:
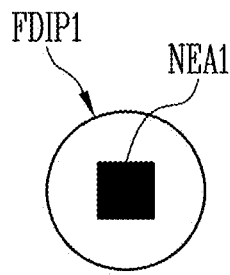
FIGS. 8A-8I are diagrams illustrating examples of a fake determination image pattern displayed in the fingerprint sensing area of the display panel of the display device shown in FIG. 1A.
Figure 8B:
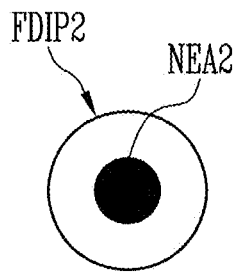
Figure 8C:
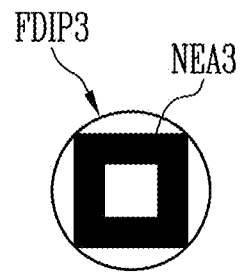
Figure 8D:
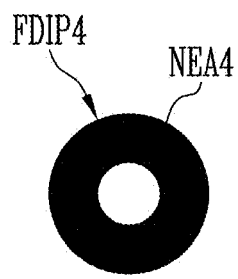
Figure 8E:
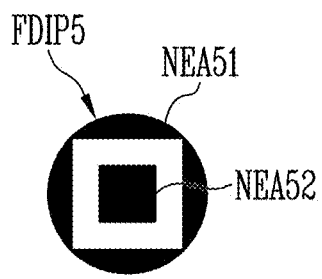
Figure 8F:
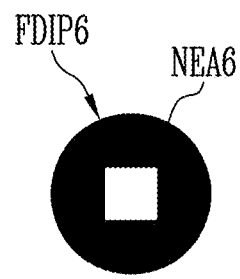
Figure 8G:
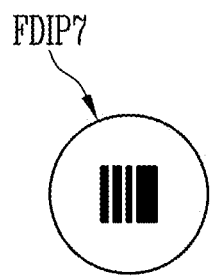
Figure 8H:
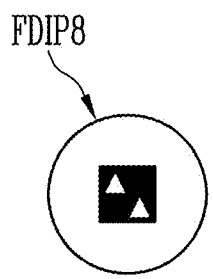
Figure 8I:
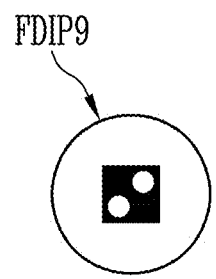

FIG. 7 is a block diagram illustrating an example of the fingerprint detector included in the display device shown in FIG. 1A.

Referring to FIGS. 1A and 7, the fingerprint detector 220 may include a pattern controller 225, a fake fingerprint detector 226, and a fingerprint analyzer 227.

In an embodiment, the fingerprint detector 220 may further include a memory 228 and a use approval determiner 229.

The fingerprint detector 220 may perform fingerprint authentication and/or fake fingerprint determination in response to a fingerprint sensing command CMD provided from the outside.

In an embodiment, the fingerprint detector 220 may further include an analog-digital converter (ADC) 224 described with reference to FIG. 3A. The ADC 224 may convert a sensing signal SS in an analog form into sensing data SD1, SD2, and SD3 in a digital form.

The pattern controller 225 may generate a fake determination image pattern IPD so as to perform fake fingerprint determination. The fake determination image pattern IPD may include an emission area and a non-emission area. The size, shape, number, and/or the like of the non-emission area included in the fake determination image pattern IPD may be randomly determined (e.g., randomly set or chosen). In some embodiments, the pattern controller 225 may randomly select and output one of various image patterns stored in the memory 228.

In an embodiment, the panel driver 210 may generate a data signal corresponding to the fake determination image pattern IPD and supply the generated data signal to the display panel 100.

The fake fingerprint detector 226 may receive first sensing data SD1 corresponding to the emission area of the fake determination image pattern IPD and second sensing data SD2 corresponding to the non-emission area of the fake determination image pattern IPD. Also, the fake fingerprint detector 226 may receive, from the memory 228, light amount information ALI set corresponding to the fake determination image pattern IPD. For example, light amount information ALI on each of various fake determination image patterns IPD may be recorded in the memory 228.

In an embodiment, the light amount information ALI may include a first light pattern LP1 as an expected sensing light amount of the emission area of the fake determination image pattern IPD and a second light pattern LP2 as an expected sensing light amount of the non-emission area of the fake determination image pattern. The expectation sensing light amount may be a light pattern or light amount to be detected from the fingerprint detector 220 when an actual fingerprint is sensed. For example, the light amount information ALI may include information such as the light pattern graph of the actual fingerprint AF, which is shown in FIG. 5D or 6C.

In an embodiment, the light amount information ALI may be stored for each fake determination image pattern IPD when the display device 1000 is initially set. In another embodiment, the light amount information ALI may be improved or optimized according to each fake determination image pattern IPD through fingerprint analysis in fingerprint registration of a user to be stored in the memory 228. In still another embodiment, the light amount information ALI may be updated in real time according to the fake determination image pattern IPD.

The fake fingerprint detector 226 may compare light profiles of the first light pattern LP1 and the first sensing data SD1, and compare light profiles of the second light pattern LP2 and the second sensing data SD2. For example, a light profile may include a light amount pattern and/or a tendency (e.g., probability) of a light amount change at a corresponding portion of the fake determination image pattern IPD.

In an embodiment, the fake fingerprint detector 226 may calculate an accordance rate (hereinafter, referred to as a first accordance rate) between the first sensing data SD1 and the first light pattern LP1 and an accordance rate (hereinafter, referred to as a second accordance rate) between the second sensing data SD2 and the second light pattern LP2. A configuration for calculating the accordance rates may be implemented as a hardware configuration and/or a software configuration (e.g., may be implemented in hardware and/or software), used for data comparison, optical analysis, and the like, which are known in the art. As used herein, accordance rate may be a measure of how closely sensed data (e.g., first sensed data SD1) matches expected data (e.g., the first light pattern LP1).

When each of the first accordance rate and the second accordance rate is a set or predetermined threshold value or more, the fake fingerprint detector 226 may determine that a sensed fingerprint is an actual fingerprint. The threshold value may be set according to sensing sensitivity and importance of security. For example, when each of the first accordance rate and the second accordance rate is about 90% or more, the fake fingerprint detector 226 may determine that the sensed fingerprint is the actual fingerprint. However, this is merely illustrative, and the threshold values of the first accordance rate and the second accordance rate may be set different from each other.

When at least one of the first accordance rate and the second accordance rate is less than the threshold value, the fake fingerprint detector 226 may determine that the sensed fingerprint is a fake fingerprint.

When it is determined that the sensed fingerprint is the actual fingerprint, the fake fingerprint detector 226 may output a first approval signal ASS1. When it is determined that the sensed fingerprint is the fake fingerprint, the fake fingerprint detector 226 may output a first refusal signal RS1. The first approval signal ASS1 or the first refusal signal RS1 may be provided to the use approval determiner 229.

In an embodiment, the fake fingerprint detector 226 may generate an approval weight AW, based on the first accordance rate and the second accordance rate. The probability that the sensed fingerprint will be the actual fingerprint is increased as the first and second accordance rates are increased. For example, the approval weight AW may be increased as the first and second accordance rates are increased. The approval weight AW may be provided to the use approval determiner 229.

The fingerprint analyzer 227 may receive third sensing data SD3 corresponding to a portion except (i.e., other than) the non-emission area of the fingerprint sensing area FSA. Also, the fingerprint analyzer 227 may receive registered fingerprint data RFD from the memory 228. The fingerprint analyzer 227 may perform fingerprint authentication by comparing the third sensing data SD3 and the registered fingerprint data RFD.

In an embodiment, when the fake determination image pattern IPD is included in the fingerprint sensing area FSA, the third sensing data SD3 includes sensing data of a portion except (i.e., other than) an area corresponding to the first and second sensing data SD1 and SD2. The third sensing data SD3 may be compared with the other portion of the registered fingerprint data RFD except a non-emission area (and/or the fake determination image pattern IPD) in the registered fingerprint data RFD.

The fingerprint analyzer 227 may calculate an accordance rate (hereinafter, referred to as a third accordance rate) between the third sensing data SD3 and an emission area of the registered fingerprint data RFD. In an embodiment, the fingerprint analyzer 227 may generate a fingerprint image corresponding to the third sensing data SD3, and may perform fingerprint authentication by comparing the generated fingerprint image with a fingerprint image of the registered fingerprint data RFD. However, this is merely illustrative, and the method for performing fingerprint authentication may be implemented by using various suitable fingerprint recognition methods known in the art. The fingerprint analyzer 227 may include a hardware configuration and/or a software configuration (e.g., may be implemented via hardware and/or software), used for fingerprint authentication.

When the third accordance rate is a set or predetermined threshold value or more, the fingerprint analyzer 227 may determine that the sensed fingerprint accords with the registered fingerprint data RFD. When the third accordance rate is less than the threshold value, the fingerprint analyzer 227 may determine that the sensed fingerprint does not accord with (e.g., does not substantially match) the registered fingerprint data.

When it is determined that the sensed fingerprint accords with the registered fingerprint data RFD, the fingerprint analyzer 227 may output a second approval signal ASS2. When it is determined when the sensed fingerprint is a fake fingerprint, the fingerprint analyzer may output a second refusal signal RS2. The second approval signal ASS2 or the second refusal signal RS2 may be provided to the use approval determiner 229.

The use approval determiner 229 may determine whether final use of the display device 1000 is to be approved, based on the result of fake fingerprint determination and the result of fingerprint authentication. In an embodiment, when the first approval signal ASS1 and the second approval signal ASS2 are generated, the use approval determiner 229 may output a use approval signal UAD to the panel driver 210 and/or an external processor. Execution of the display device 1000 or a corresponding application may be approved based on the use approval signal UAD.

In an embodiment, when at least one of the first refusal signal RS1 and the second refusal signal RS2 is generated, the use approval determiner 229 may output a use disapproval signal UDAD to the panel driver 210 and/or the external processor. The display device 1000 or the corresponding application is not executed based on the use disapproval signal U DAD. For example, the display device 1000 or the corresponding application may not be executed when the use disapproval signal UDAD is generated/received.

In an embodiment, the fake fingerprint detector 226 may generate the approval weight AW instead of the first approval signal ASS1 and the first refusal signal RS1. The use approval determiner 229 receiving the approval weight AW and the second approval signal ASS2 may determine use approval according to a magnitude of the approval weight AW. When the use approval determiner 229 receives the second refusal signal RS2, the use approval determiner 229 may output the use disapproval signal UDAD, regardless of the size of the approval weight AW.

As described above, the display device 1000 in accordance with the embodiments of the present disclosure can detect a fake fingerprint by analyzing a light amount or light pattern in the non-emission area included in the fake determination image pattern IPD. Accordingly, the accuracy and reliability of fingerprint detection can be improved without increasing any manufacturing cost and/or any additional configuration.

FIGS. 8A-8I are diagrams illustrating examples of the fake determination image pattern displayed in the fingerprint sensing area of the display panel of the display device shown in FIG. 1A.

Referring to FIGS. 1A, 7, and 8A-8I, fake determination image patterns FDIP1 to FDIP9 may include non-emission areas NEA1 to NEA6 having various suitable shapes and various suitable sizes.

The non-emission areas NEA1 to NEA6 included in the fake determination image patterns FDIP1 to FDIP9 may have a polygonal shape such as quadrangular shape, and a free shape (e.g., a curved shape) such as a circular shape or an elliptical shape. In addition, a plurality of non-emission areas, such as NEA51 and NEA52, may be included as shown in a fifth fake determination image pattern FDIP5.

In an embodiment, the fake determination image patterns FDIP1 to FDIP9 may have the same size as the fingerprint sensing area FSA. In another embodiment, the fake determination image patterns FDIP1 to FDIP9 may overlap with a portion of the fingerprint sensing area FSA.

Fingerprint authentication may be performed by using sensing data of the other portion of the fingerprint sensing area FSA, in which the fake determination image patterns FDIP1 to FDIP9 are not displayed.

In an embodiment, the pattern controller 225 may randomly change the fake determination image pattern (e.g., IPD shown in FIG. 7) displayed in the display panel 100 in a set or predetermined period. For example, the pattern controller 225 may change the fake determination image pattern IPD whenever the fake fingerprint determination is performed. For example, one of first to ninth fake determination image patterns FDIP1 to FDIP9 may be randomly selected whenever the fake fingerprint determination is performed.

Accordingly, the first light pattern LP1 and the second light pattern LP2 may be randomly changed whenever the fake fingerprint determination is performed. Thus, a fake attempt using an image or surface material having optical properties similar to those of skin can be blocked, and the reliability of fingerprint detection can be further improved.

Figure 9:
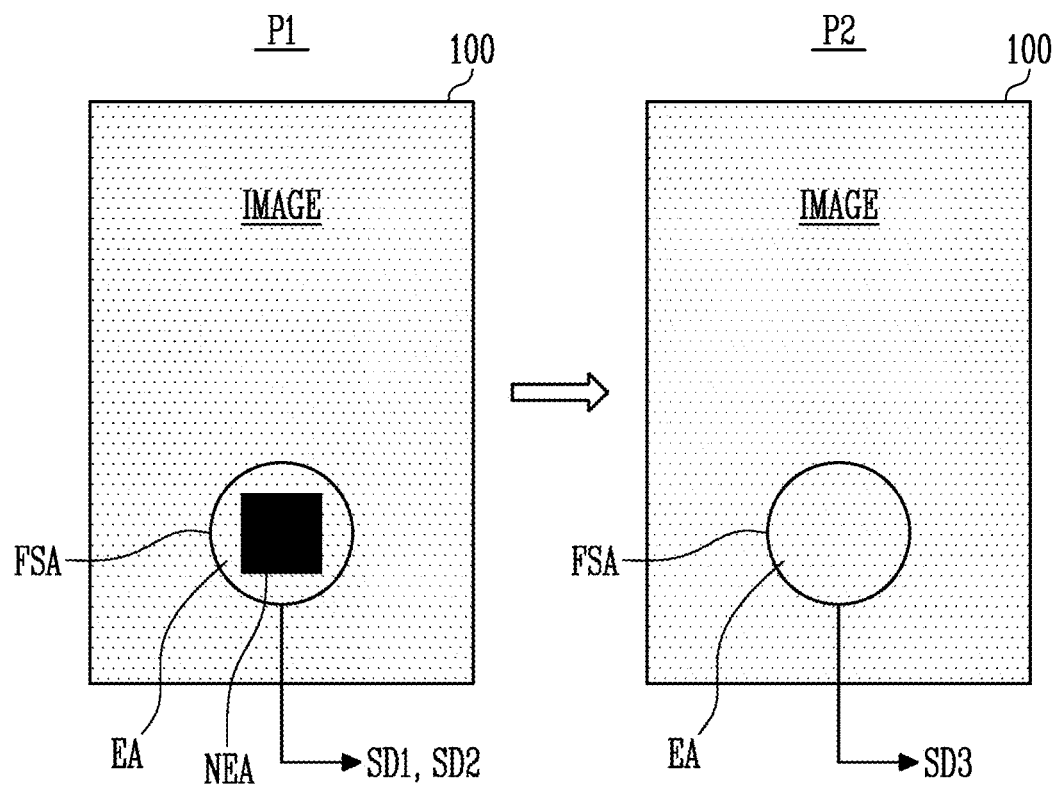
FIG. 9 is a diagram illustrating an example of sensing data sensed in the fingerprint sensing area of the display panel of the display device shown in FIG. 1A.

FIG. 9 is a diagram illustrating an example of the sensing data sensed in the fingerprint sensing area of the display panel of the display device shown in FIG. 1A.

Referring to FIGS. 1A, 7, and 9, the fingerprint detector 220 may perform fake fingerprint determination or fingerprint authentication in different periods.

In an embodiment, the pattern controller 225 may generate a fake determination image pattern IPD including a non-emission area NEA in a first period P1, and stop the generation of the fake determination image pattern in a second period P2.

Each of the first period P1 and the second period P2 may include at least one frame period. In addition, the second period P2 may follow (e.g., immediately follow) after the first period P1 is completed. A fingerprint detection procedure may be performed throughout the first period P1 and the second period P2, and a target object is continuously touched in the fingerprint sensing area FSA during a time including at least the first period P1 and the second period P2. However, this is merely illustrative, and the sequence, interval, length, etc. of the first period P1 and the second period P2 are not limited thereto, and any suitable sequence, interval, length, etc. of the first period P1 and the second period P2 may be used.

In the first period P1, another general image may be displayed in another portion of the display area AA except the fingerprint sensing area FSA, or the another portion may be in an off state. In addition, an emission area EA of the fake determination image pattern IPD may display an image different from that of the display area AA at the periphery thereof.

In the first period P1, first and second sensing data SD1 and SD2 sensed from the fake determination image pattern IPD may be generated. The fingerprint detector 220 (e.g., the fake fingerprint detector 226) may perform fake fingerprint determination by using the first and second sensing data SD1 and SD2.

Because only a fake fingerprint determination procedure is performed during the first period P1, there is no problem even when the size of the non-emission area NEA is increased. For example, the size of the non-emission area NEA may be increased so as to improve the accuracy of fake fingerprint detection.

In the second period P2, the fake determination image pattern IPD is not displayed in the fingerprint sensing area FSA. Accordingly, the whole of the fingerprint sensing area FSA can emit light. In the second period P2, third sensing data SD3 corresponding to the whole of the fingerprint sensing area FSA may be generated. The fingerprint analyzer 227 may perform fingerprint authentication by using the third sensing data SD3. That is, a fingerprint image may be acquired by using the entire light information received by the photo sensor. Thus, the accuracy and reliability of fingerprint authentication can be improved.

As described above, the display device 1000 in accordance with the embodiments of the present disclosure detects a fake fingerprint by using the fake determination image pattern IPD displayed in the first period P1, and performs fingerprint authentication by using the light data (e.g., the third sensing data SD3) sensed in the second period P2 in which the fake determination image pattern IPD is not displayed. Accordingly, the reliability of fake fingerprint detection and fingerprint authentication can be improved.

Figure 10:
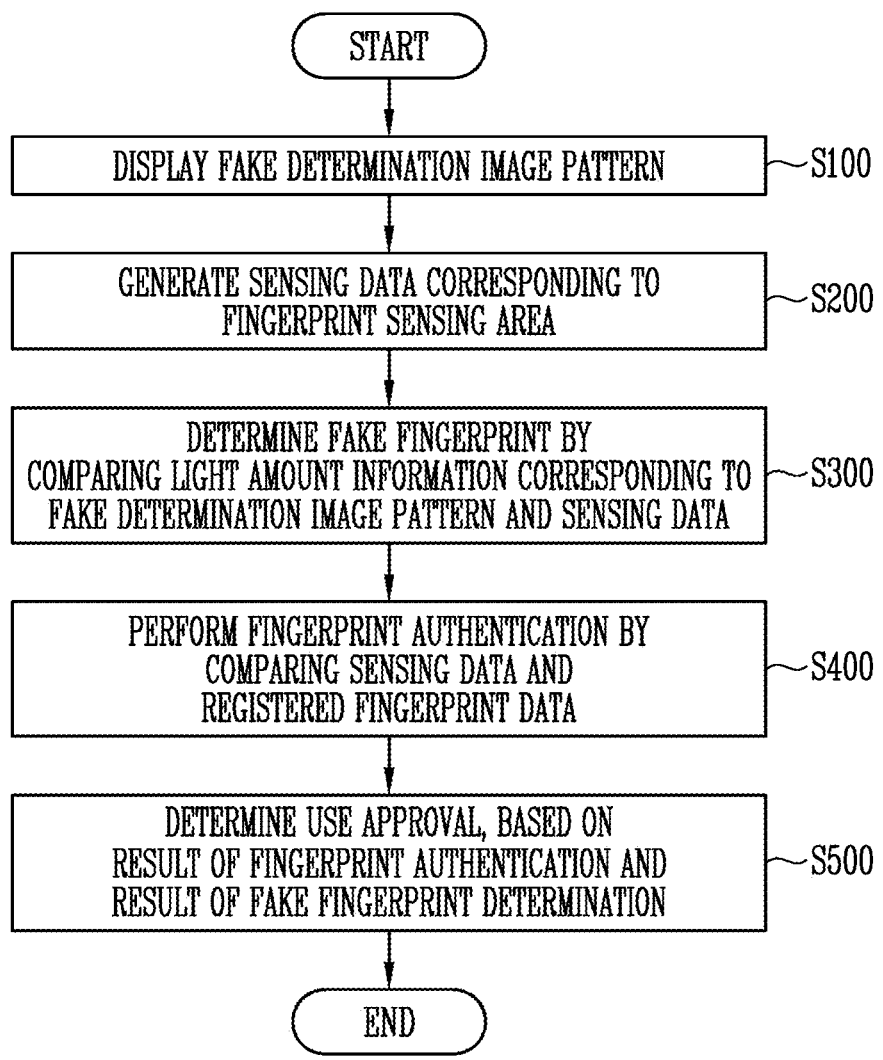
FIG. 10 is a flow diagram illustrating a method for driving the display device in accordance with an embodiment of the present disclosure.

FIG. 10 is a flow diagram illustrating a method for driving the display device in accordance with an embodiment of the present disclosure.

Hereinafter, in FIGS. 10 to 14, components identical to those described above are designated by like reference numerals, and descriptions thereof may not be repeated.

Referring to FIGS. 1A to 10, in the method for driving the display device, a fake determination image pattern IPD including an emission area EA and a non-emission area NEA may be displayed in a fingerprint sensing area FSA (S100), sensing data corresponding to the fingerprint sensing area FSA may be generated by using a photo sensor PS (S200), a fake fingerprint may be determined by comparing light amount information corresponding to the fake determination image pattern IPD and the sensing data (S300), fingerprint authentication may be performed by comparing the sensing data and registered fingerprint data RFD (S400), and use approval may be determined based on the result of the fingerprint authentication and the result of the fake fingerprint determination (S500).

A detailed operation of the method including the fingerprint authentication and the fake fingerprint determination, may be performed by using various suitable methods as shown in FIGS. 11 to 14.

Figure 11:
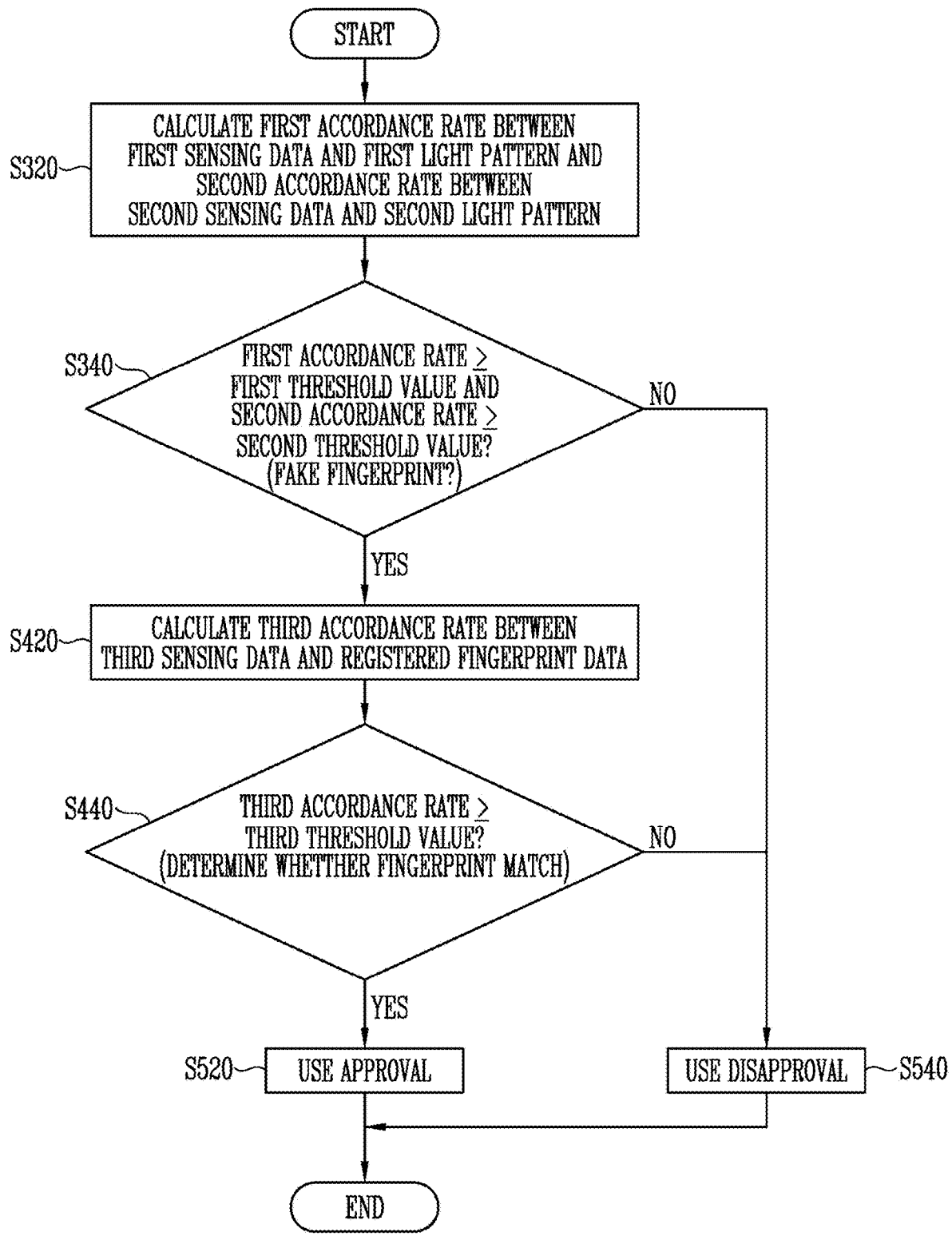
FIG. 11 is a flow diagram illustrating an example of the method shown in FIG. 10.

FIG. 11 is a flow diagram illustrating an example of the method shown in FIG. 10.

Referring to FIGS. 1A to 11, a fake fingerprint determination procedure and a fingerprint authentication procedure may be sequentially performed by using light sensed from a fingerprint sensing area FSA including a fake determination image pattern IPD.

Initially, first to third sensing data SD1, SD2, and SD3 may be detected by the light sensed from the fingerprint sensing area FSA including the fake determination image pattern IPD (S200).

The step S300 of determining a fake fingerprint may include calculating a first accordance rate by comparing a first light pattern LP1 of an emission area EA, which is included in light amount information ALI, with the first sensing data SD1, and calculating a second accordance rate by comparing a second light pattern LP2 included in the light amount information ALI with the second sensing data SD2 (S320).

Subsequently, the first accordance rate may be compared with a first threshold value, and the second accordance rate may be compared with a second threshold value (S340).

When the first accordance rate is less than the first threshold value or when the second accordance rate is less than the second threshold value, it may be determined that a sensed fingerprint is a fake fingerprint. In addition, when the first accordance rate is less than the first threshold value and when the second accordance rate is less than the second threshold value, it may be determined that the sensed fingerprint is a fake fingerprint. When it is determined that the sensed fingerprint is a fake fingerprint, the use of the display device 1000 or a corresponding application may be disapproved. In addition, when it is determined that the sensed fingerprint is a fake fingerprint, the step S400 of performing the fingerprint authentication may be omitted.

When the first accordance rate is the first threshold value or more and when the second accordance rate is the second threshold value or more, it may be determined that the sensed fingerprint is an actual fingerprint. In addition, when the first accordance rate is the first threshold value or more and when the second accordance rate is the second threshold value or more, the step S400 of performing the fingerprint authentication, which is shown in FIG. 10, may be started.

For example, the step S400 of performing the fingerprint authentication may include calculating a third accordance rate as an accordance rate between third sensing data SD3 and registered fingerprint data RFD (S420), and comparing the third accordance rate and a third threshold value (S440).

When the third accordance rate is less than the third threshold value, it may be determined that the sensed fingerprint does not accord with the registered fingerprint data RFD. When it is determined that the sensed fingerprint does not accord with the registered fingerprint data RFD, the use of the display device 1000 or the corresponding application may be disapproved (S540).

When the third accordance rate is the third threshold value or more, it may be determined that the sensed fingerprint accords with the registered fingerprint data RFD. When it is determined that the sensed fingerprint accords with the registered fingerprint data RFD, the use of the display device 1000 or the corresponding application may be approved (S520).

In other words, when it is determined that the third sensing data SD3 and the registered fingerprint data RFD accord with each other (i.e., their accordance rate is higher than a threshold), and the sensed fingerprint is the actual fingerprint, the use of the display device 1000 or the corresponding application may be approved (S520).

As described above, in the method in accordance with the embodiment shown in FIG. 11, the fingerprint authentication is performed after it is determined whether the sensed fingerprint is a fake fingerprint, so that the calculation load in fingerprint detection can be decreased.

Figure 12:
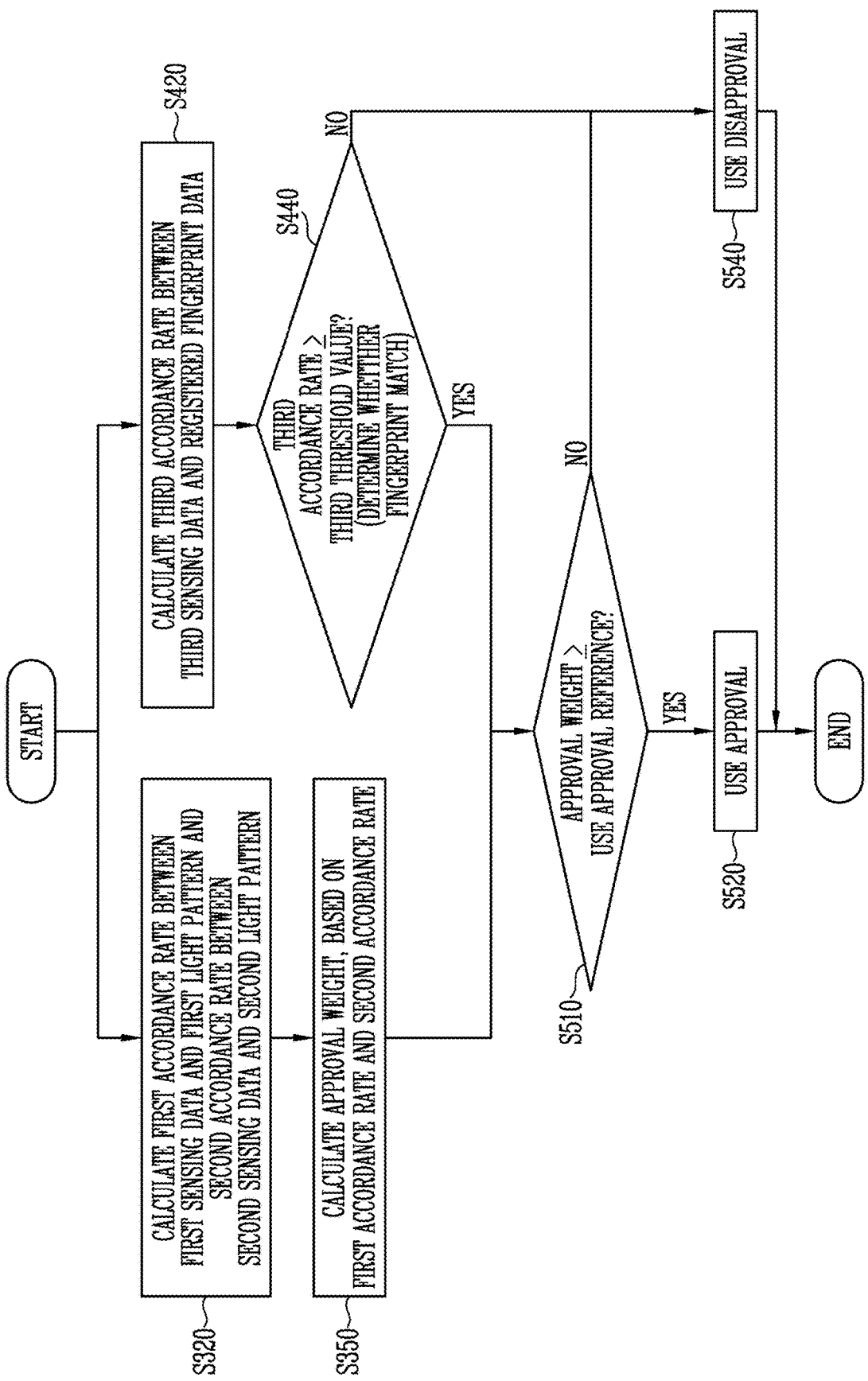
FIG. 12 is a flow diagram illustrating another example of the method shown in FIG. 10.

FIG. 12 is a flow diagram illustrating another example of the method shown in FIG. 10.

Referring to FIGS. 1A to 10 and 12, a fake fingerprint determination procedure and a fingerprint authentication procedure may be performed in parallel (e.g., performed concurrently/simultaneously) by using light sensed from a fingerprint sensing area FSA including a fake determination image pattern IPD.

The step S300 of determining a fake fingerprint may include calculating first and second accordance rates (S320), and calculating an approval weight AW, based on the first accordance rate and the second accordance rate (S350).

In an embodiment, the step S400 of performing the fingerprint authentication may be performed in parallel to (e.g., performed concurrently/simultaneously with) the step S300 of determining a fake fingerprint. The step S400 of performing the fingerprint authentication may include calculating a third accordance rate (S420), and comparing the third accordance rate and a third threshold value (S440).

When the third accordance rate is less than the third threshold value, the use of the display device 1000 or a corresponding application may be disapproved (S540).

When a third accordance rate is the third threshold value or more, the step S500 of determining the use approval may be performed. The approval weight AW and a set or predetermined use approval reference may be compared (S510).

When the approval weight AW is the use approval reference or more, the use of the display device 1000 or the corresponding application may be approved (S520).

When the approval weight AW is less than the use approval reference, the use of the display device 1000 or the corresponding application may be disapproved (S540).

As described above, an image is acquired once by reflected light in the fingerprint sensing area FSA including the fake determination image pattern IPD, so that the fake fingerprint detection and the fingerprint authentication can be performed in parallel (e.g., performed concurrently/simultaneously). Thus, the time required to perform fingerprint detection and use approval can be reduced.

Figure 13:
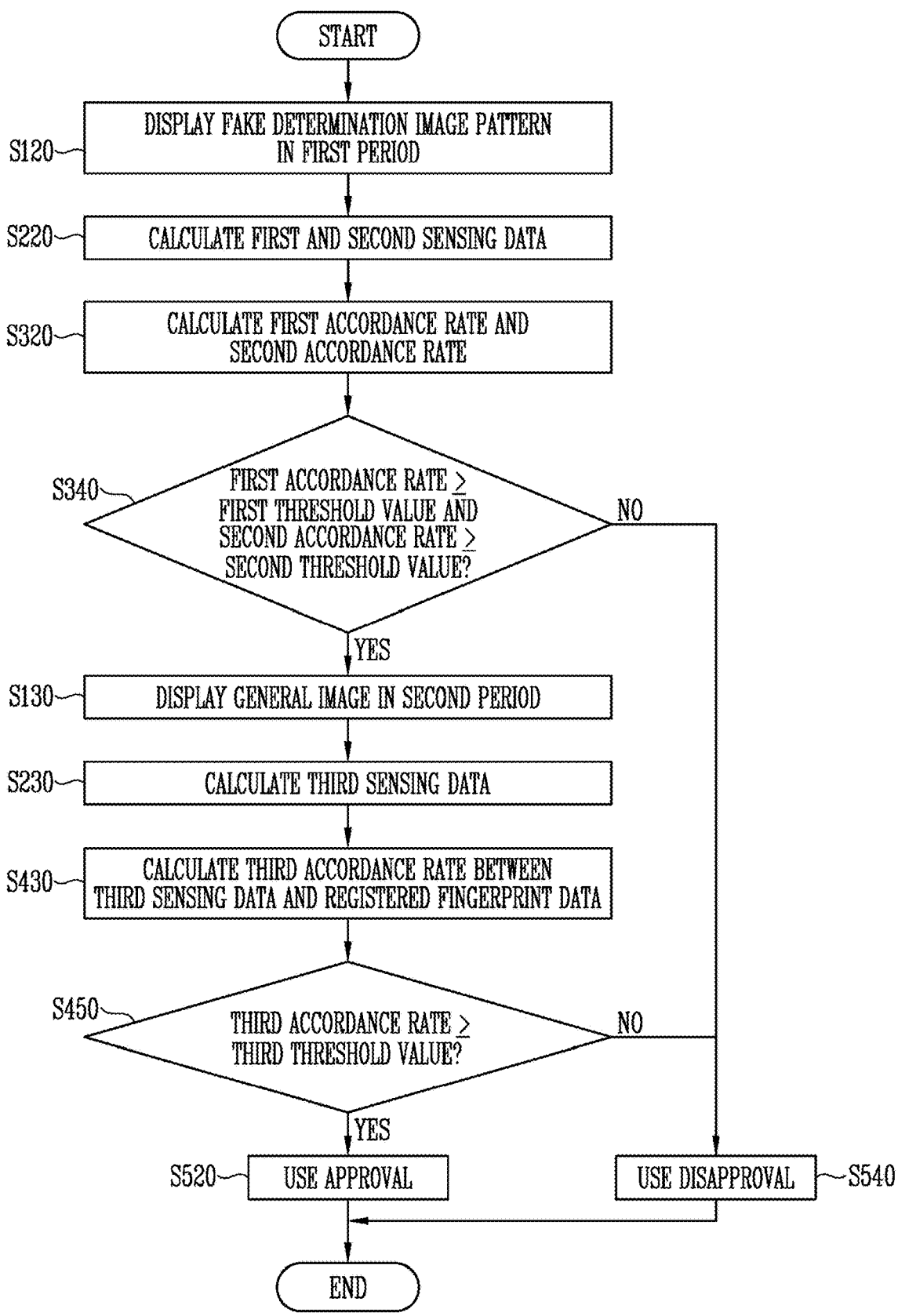
FIG. 13 is a flow diagram illustrating still another example of the method shown in FIG. 10.

FIG. 13 is a flow diagram illustrating still another example of the method shown in FIG. 10.

In FIG. 13, components identical to those described with reference to FIG. 11 are designated by like reference numerals, and descriptions thereof may not be repeated.

Referring to FIGS. 1A to 11 and 13, the step S300 of determining a fake fingerprint may be performed based on a fake determination image pattern IPD in a first period P1, and the step S400 of performing the fingerprint authentication may be performed based on a general image in a second period P2.

In the first period P1, the fake determination image pattern IPD may be displayed in a fingerprint sensing area FSA (S120). First and second sensing data SD1 and SD2 may be calculated based on the fake determination image pattern IPD (S220), and first accordance rate and a second accordance rate may be calculated (S320).

Then, the first accordance rate and a first threshold value may be compared, and the second accordance rate and a second threshold value may be compared (S340).

When the first accordance rate is less than the first threshold value or when the second accordance rate is less than the second threshold value, the use of the display device 1000 or a corresponding application may be disapproved (S540).

When the first accordance rate is the first threshold value or more and when the second accordance rate is the second threshold value or more, the second period P2 may be performed. In the second period P2, an image (e.g., the general image) for fingerprint sensing may be displayed in the fingerprint sensing area (S130). For example, the whole of the fingerprint sensing area FSA may emit light with a high luminance in the second period P2.

Third sensing data SD3 about the whole of the fingerprint sensing area FSA may be calculated (S230), and a third accordance rate between the third sensing data SD3 and registered fingerprint data RFD may be calculated (S430).

Then, the third accordance rate and a third threshold value may be compared (S450). When the third accordance rate is less than the third threshold value, the use of the display device 1000 and the corresponding application may be disapproved (S540). When the third accordance rate is the third threshold value or more, the use of the display device 1000 and the corresponding application may be approved (S520).

In the embodiment shown in FIG. 13, the reliability of fake fingerprint detection and the reliability of fingerprint authentication can be further improved, as compared with the method shown in FIG. 11.

Figure 14:
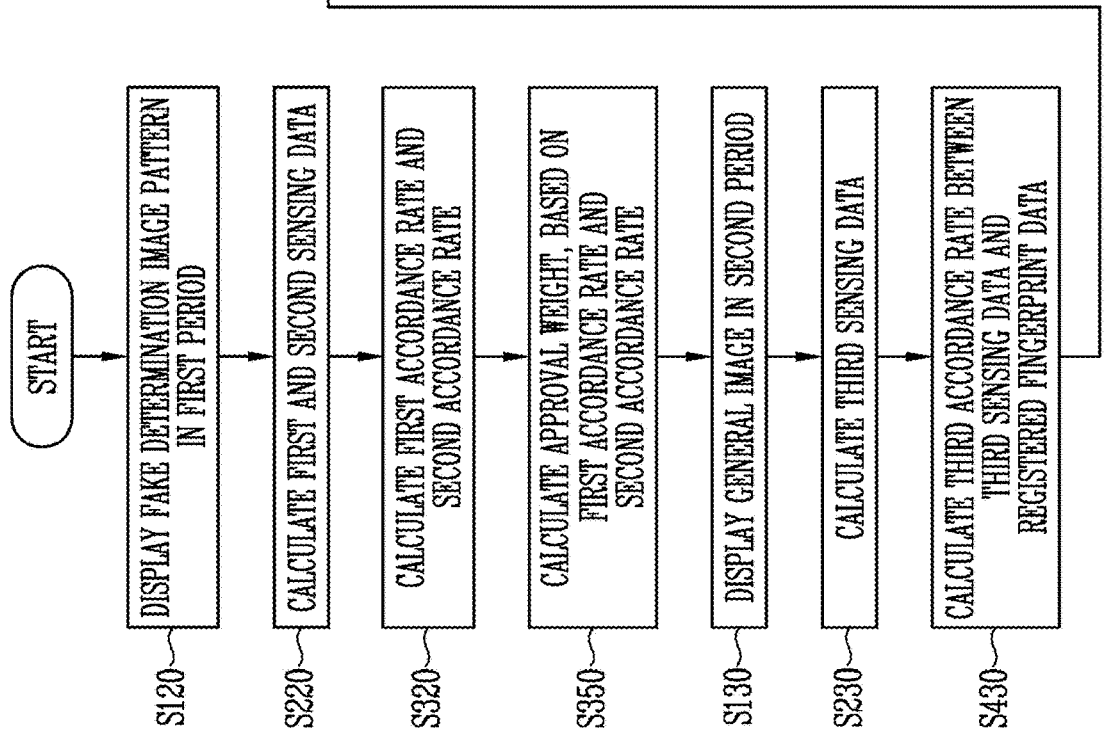
FIG. 14 is a flow diagram illustrating still another example of the method shown in FIG. 10.

FIG. 14 is a flow diagram illustrating still another example of the method shown in FIG. 10.

In FIG. 14, components identical to those described with reference to FIGS. 12 and 13 are designated by like reference numerals, and descriptions thereof may not be repeated.

Referring to FIGS. 1A to 12 and 14, the step S300 of determining a fake fingerprint, based on a fake determination image pattern IPD, may be performed in a first period P1, and the step S400 of performing the fingerprint authentication, based on a general image, may be performed in a second period P2.

In an embodiment, an approval weight AW may be calculated based on a first accordance rate and a second accordance rate (S350). In addition, fingerprint authentication (e.g., including S130, S230, S430, and S450), based on third sensing data SD3, may be performed in a second period P2, regardless of the result of the approval weight AW.

Subsequently, the approval weight AW and a use approval reference may be compared (S515).

When a third accordance rate is a third threshold value and when the approval weight AW is the use approval reference or more, the use of the display device 1000 or a corresponding application may be approved (S520). When the third accordance rate is less than the third threshold value or when the approval weight AW is less than the use approval reference, the use of the display device 1000 or the corresponding application may be disapproved (S540).

In the embodiment shown in FIG. 14, the accuracy of fake fingerprint determination can be further improved.

As described above, in the display device and the method for driving the same in accordance with the embodiments of the present disclosure, a fake fingerprint can be detected by analyzing a light amount or light pattern in the non-emission area included in the fake determination image pattern. Accordingly, the accuracy and reliability of fingerprint detection can be improved without increasing any manufacturing cost and/or any additional configuration.

It will be understood that, although the terms "first", "second", "third", etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art. Further, a specific quantity or range recited in this written description or the claims may also encompass the inherent variations in measured or calculated values that would be recognized by those of ordinary skill in the art.

As used herein, the terms "use," "using," and "used" may be considered synonymous with the terms "utilize," "utilizing," and "utilized," respectively.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification.

The display device and/or any other relevant devices or components according to embodiments of the present invention described herein, such as the fingerprint detector, may be implemented utilizing any suitable hardware, firmware (e.g. an application-specific integrated circuit), software, or a suitable combination of software, firmware, and hardware. For example, the various components of the display device may be formed on one integrated circuit (IC) chip or on separate IC chips. Further, the various components of the display device may be implemented on a flexible printed circuit film, a tape carrier package (TCP), a printed circuit board (PCB), or formed on a same substrate. Further, the various components of the display device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Example embodiments have been disclosed herein, and although specific terms are employed, they are used and are to be interpreted in a generic and descriptive sense and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various suitable changes in form and details may be made without departing from the spirit and scope of the present disclosure as define by the following claims and equivalents thereof.

What is claimed is:

1. A display device comprising:
a display panel comprising a plurality of pixels configured to display an image;
a photo sensor on one surface of the display panel to sense light; and
a fingerprint detector configured to control a fake determination image pattern of a fingerprint sensing area of the display panel to sense a fingerprint, and to perform fingerprint authentication and fake fingerprint determination based on a sensing signal supplied from the photo sensor, the fingerprint detector is further configured to:
generate the fake determination image pattern such that a non-emission area is within the fingerprint sensing area for a purpose of the fake fingerprint determination;
perform the fake fingerprint determination by comparing first sensing data corresponding to an emission area of the fake determination image pattern and second sensing data corresponding to the non-emission area with light amount information set corresponding to the fake determination image pattern; and
perform the fingerprint authentication by comparing third sensing data corresponding to the fingerprint sensing area except the non-emission area with registered fingerprint data.

2. The display device of claim 1, wherein the fake determination image pattern has a non-emission area and an emission area.

3. The display device of claim 2, wherein the fingerprint detector performs the fake fingerprint determination by analyzing a light amount sensed at the non-emission area.

4. The display device of claim 3, wherein the fingerprint detector is further configured to determine that a sensed fingerprint is a fake fingerprint in response to determining that the light amount sensed at the non-emission area is less than a reference light amount.

5. The display device of claim 4, wherein the fingerprint detector is further configured to determine that the sensed fingerprint is an actual fingerprint in response to determining that the light amount sensed at the non-emission area is greater than or equal to the reference light amount.

6. The display device of claim 1, wherein the fingerprint detector is configured to compare light profiles of a first light pattern as an expected sensing light amount of the emission area, which is comprised in the light amount information, and the first sensing data, and
wherein the fingerprint detector is configured to compare light profiles of a second light pattern as an expected sensing light amount of the non-emission area, which is comprised in the light amount information, and the second sensing data.

7. The display device of claim 6, wherein the fingerprint detector is further configured to determine that a sensed fingerprint is an actual fingerprint in response to determining that an accordance rate between the first sensing data and the first light pattern and an accordance rate between the second sensing data and the second light pattern are greater than or equal to a threshold value.

8. The display device of claim 6, wherein the fingerprint detector is further configured to determine that a sensed fingerprint is a fake fingerprint in response to determining that at least one of an accordance rate between the first sensing data and the first light pattern and an accordance rate between the second sensing data and the second light pattern is less than a threshold value.

9. The display device of claim 1, further comprising:
a memory configured to store the light amount information corresponding to the fake determination image pattern and the registered fingerprint data; and
a use approval determiner configured to determine whether to approve use of the display device based on the fake fingerprint determination and the fingerprint authentication.

10. The display device of claim 1, wherein the fingerprint detector is further configured to randomly change the fake determination image pattern displayed in the display panel in a period.

11. The display device of claim 1, wherein the fingerprint detector is configured to generate the fake determination image pattern in a first period, and to stop generation of the fake determination image pattern in a second period.

12. The display device of claim 11, wherein the fingerprint detector is configured to perform the fake fingerprint determination by using the first sensing data and the second sensing data, which are sensed in the first period, and
wherein the fingerprint detector is configured to perform the fingerprint authentication by using the third sensing data sensed in the second period.

13. The display device of claim 1, wherein the fingerprint detector is further configured to compare an accordance rate between a portion corresponding to the emission area in the registered fingerprint data and the third sensing data.

* * * * *

UNITED STATES PATENT AND TRADEMARK OFFICE
CERTIFICATE OF CORRECTION

PATENT NO. : 11,423,691 B2
APPLICATION NO. : 16/927622
DATED : August 23, 2022
INVENTOR(S) : Seung Hyun Moon et al.

Page 1 of 1

It is certified that error appears in the above-identified patent and that said Letters Patent is hereby corrected as shown below:

On the Title Page

Column 1, (72) Inventors, Line 6     Delete "Chui" and
                                      Insert -- Chul --

Column 1, (72) Inventors, Line 9     Delete "Chui" and
                                      Insert -- Chul --

Signed and Sealed this
Fourth Day of July, 2023

Katherine Kelly Vidal
*Director of the United States Patent and Trademark Office*